United States Patent
Kuipers et al.

(10) Patent No.: US 9,294,212 B2
(45) Date of Patent: Mar. 22, 2016

(54) SYSTEMS AND METHODS FOR AVOIDING CROSSTALK

(71) Applicants: Martin Kuipers, Dallow-Doeberitz (DE); Richard L. Goodson, Huntsville, AL (US); Fred Chu, Madison, AL (US)

(72) Inventors: Martin Kuipers, Dallow-Doeberitz (DE); Richard L. Goodson, Huntsville, AL (US); Fred Chu, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 151 days.

(21) Appl. No.: 13/913,348

(22) Filed: Jun. 7, 2013

(65) Prior Publication Data

US 2013/0272314 A1     Oct. 17, 2013

Related U.S. Application Data

(63) Continuation-in-part of application No. 13/397,662, filed on Feb. 15, 2012.

(60) Provisional application No. 61/443,126, filed on Feb. 15, 2011, provisional application No. 61/656,783, filed on Jun. 7, 2012.

(51) Int. Cl.
| | |
|---|---|
| *H04J 3/10* | (2006.01) |
| *H04L 5/22* | (2006.01) |
| *H04L 12/403* | (2006.01) |
| *H04L 12/64* | (2006.01) |
| *H04L 12/873* | (2013.01) |

(52) U.S. Cl.
CPC ... *H04J 3/10* (2013.01); *H04L 5/22* (2013.01); *H04L 12/403* (2013.01); *H04L 12/6418* (2013.01); *H04L 47/52* (2013.01)

(58) Field of Classification Search
None
See application file for complete search history.

(56) References Cited

U.S. PATENT DOCUMENTS

| | | | |
|---|---|---|---|
| 8,411,696 B1 * | 4/2013 | Ko et al. | 370/419 |
| 2003/0117980 A1 * | 6/2003 | Kim et al. | 370/332 |
| 2005/0068193 A1 * | 3/2005 | Osterloh et al. | 340/870.02 |
| 2010/0074312 A1 * | 3/2010 | Cioffi et al. | 375/222 |
| 2010/0111523 A1 | 5/2010 | Hirth et al. | |
| 2010/0115079 A1 * | 5/2010 | Sakoda et al. | 709/223 |
| 2012/0026926 A1 * | 2/2012 | Frenzel et al. | 370/311 |
| 2012/0069766 A1 * | 3/2012 | Fu et al. | 370/252 |

FOREIGN PATENT DOCUMENTS

EP     1011206 A2     6/2000

OTHER PUBLICATIONS

Oksman, V., et al., G.hn: The New ITU-T Home Networking Standard, IEEE Communications Magazine, Oct. 1, 2009, pp. 138-145.
Humphrey, L., G.VDSL: Discontinuous VDSL2, International Telecommunication Union, Geneva, CH, Apr. 26, 2011, vol. 4/15.

* cited by examiner

*Primary Examiner* — Omar Ghowrwal
(74) *Attorney, Agent, or Firm* — Maynard Cooper & Gale PC; Jon E. Holland

(57) ABSTRACT

A controller at a distribution point (DP) of a communication system is coupled to a plurality of customer premises (CP) transceivers via drop connections. The controller is configured to schedule upstream and downstream data transmissions across the drop connections such that they do not overlap from one drop connection to another thereby avoiding the effects of crosstalk. A flexible frame structure is used to permit dynamic scheduling changes. Overhead for the flexible frame structure is permitted to overlap on the drop connections, and a reduced bit loading is used to communicate the overhead relative to the bit loading used for data transmissions.

13 Claims, 19 Drawing Sheets

SYSTEMS AND METHODS FOR AVOIDING CROSSTALK

CROSS REFERENCE TO RELATED APPLICATIONS

This application is a continuation-in-part of and claims priority to U.S. patent application Ser. No. 13/397,662, entitled "Systems and Methods for Communicating Across Drop Connections" and filed on Feb. 15, 2012, which is incorporated herein by reference. U.S. patent application Ser. No. 13/397,662 claims priority to U.S. Provisional Patent Application No. 61/443,126, entitled "Systems and Methods for Using G.HN for FTTDP Applications" and filed on Feb. 15, 2011, which is incorporated herein by reference. This application also claims priority to U.S. Provisional Patent Application No. 61/656,783, entitled "Flexible Framing Structure for a Communication System" and filed on Jun. 7, 2012, which is incorporated herein by reference.

RELATED ART

In an effort to provide customers with higher data rates, existing copper facilities are being migrated to optical fiber, which provides data rates much greater than those traditionally enabled by copper. However, deploying fiber all of the way to the customer premises is expensive, and during the migration from copper to fiber, it is often the case where fiber is fed from a network facility, such as a central office, to an intermediate point close to a customer premises, such as a distribution point (DP), without extending all of the way to the customer premises. The existing copper infrastructure is then leveraged to provide communication from the intermediate point to the customer premises. The connections from a DP to a customer premises, often referred to as "drop connections," are relatively short, thereby providing high data rates using modulation formats and data rates that may otherwise be problematic for copper connections in other portions of the network where the length of the copper connections may be much greater. Such arrangements are sometimes referred to as FTTDP, or fiber-to-the-distribution-point arrangements.

A variety of digital subscriber line (DSL) formats have been used for communication from a fiber-fed DP to a customer premises. Very-high-bit-rate DSL (VDSL) is a solution that is attractive due to the relatively high data rates enabled by VDSL as compared to other DSL solutions. Indeed, first generation VDSL provides data transmission up to about 52 Mega-bits per second (Mbits) downstream and about 16 Mbit/s upstream. Second generation VDSL, sometimes referred to as VDSL2, provides up to about 100 Mbit/s simultaneously in the both the upstream and downstream directions.

VDSL, as well as other DSL services, have traditionally been implemented using point-to-point architectures. In a point-to-point architecture, transmission across each drop connection is generally independent of the transmissions across the other drop connections. That is, each drop connection is driven by a separate transceiver. Thus, the signals transmitted across one drop connection do not affect signals on other drop connections that are not bundled in the same cable. For drop connections bundled in the same cable, crosstalk can couple from one connection to another thereby degrading signal quality. Vectoring can be used to cancel crosstalk, but vectoring operations are generally complex and computationally expensive.

There are various recognized advantages that a point-to-point architecture provides. For example, data security is enhanced since a transmission by or for one customer is not received by another customer. Further, with the exception of crosstalk, which is relatively small, noise from one drop connection does not affect another drop connection for point-to-point transmissions. Indeed, a rogue transmitter (i.e., a transmitter that is uncontrollably babbling) on one drop connection, for example, should not interrupt transmissions on other drop connections. Also, line drivers do not have to drive multiple lines, allowing lower power consumption per transceiver. In addition, the point-to-point channel is relatively simple since it does not have in effect multiple bridged taps, which may need to be employed in other types of architectures.

As the demand for data services continues to grow, there is a desire for solutions that provide higher data rates while remaining compatible with existing DSL services. However, higher data rates usually translate into higher power requirements, which can create problems at some remote locations, such as DPs, where an abundant supply of power sources may not be readily available.

To help keep power requirements lower, a point-to-multipoint architecture may be used where multiple subscribers share resources at the DP. Since resources (e.g., transceivers) are shared at the DP, the overall power consumption and equipment costs can be reduced relative to a point-to-point architecture. However, previous systems for implementing point-to-multipoint communication sacrifice the advantages described above for point-to-point operation.

Thus, a heretofore need exists for DP communication systems that allow for high data rates with power consumption reduced to levels approaching point-to-multipoint operation, while keeping many of the desirable characteristics of point-to-point transmission. Additionally, there is a need in the art for mitigating the effects of crosstalk to achieve high peak data rates while avoiding the use of complex vectoring operations.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
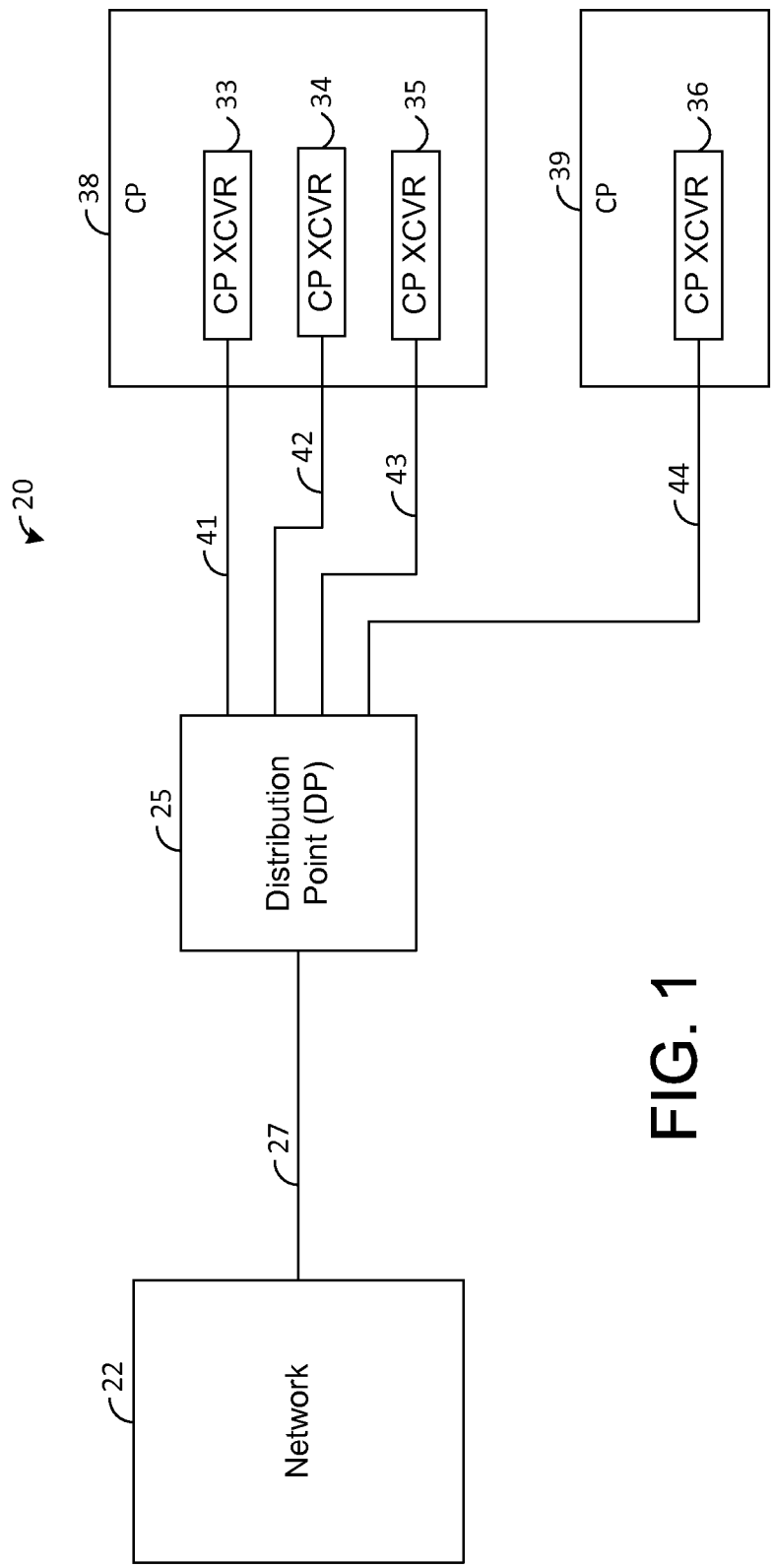
FIG. 1 is a block diagram illustrating an exemplary embodiment of a communication system.

The present disclosure generally pertains to systems and methods for communicating across drop connections. In one exemplary embodiment, a controller at a distribution point (DP) is coupled to a plurality of customer premises (CP) transceivers via drop connections in a point-to-multipoint architecture. Each drop connection is coupled to at least one switch that operates under the control of the controller for selectively isolating the drop connections from the controller, as well as the CP transceivers of other drop connections. In this regard, by controlling the states of the switches, the DP controller can control to which of the CP transceivers it is communicatively connected, and during operation the DP controller controls the switches such that it is communicatively connected only to the CP transceivers for which communication is desired or needed during a particular time interval. Thus, during some time intervals, the DP controller may be communicatively connected to a large number of CP transceivers for point-to-multipoint communications, thereby providing a solution with low power consumption relative to the number of active drop connections. In this regard, by sharing various components such as analog front end (AFE) circuitry and physical (PHY) layer circuitry for multiple drop connections, significant power savings are possible. However, for other time intervals, the number of CP transceivers communicatively coupled to the DP controller is reduced, thereby transitioning the performance of the system closer to a point-to-point solution and realizing, at least to an extent, many of the desirable characteristics of point-to-point transmission.

In one exemplary embodiment, the system uses G.hn of G.fast for the communication occurring across the drop connections, although other protocols may be used in other embodiments if desired. G.hn is a home networking (hn) protocol that uses discrete multi-tone (DMT) technology to provide data service over a shared medium, such as a power line, coaxial cable, or twisted-wire pair. It is designed for twisted-pair media and a wide enough bandwidth to deliver relatively high data rates, making it a suitable protocol for communication across drop connections extending from a DP in a telecommunication environment.

In a typical G.hn system, G.hn devices are connected in a star topology throughout a residence via the telephone, cable, or power lines that run through the residence. As an example, G.hn devices may be interfaced with the phone jacks within a home and communicate over the telephone wiring within such home.

G.hn standards specify the physical layer and the data link layer of the International Organization for Standardization Open Systems Interconnection (ISO/OSI) model. A G.hn device often accepts frames of a certain protocol, such as Ethernet frames, and encapsulates each frame to form a data packet, referred to herein as a "G.hn data unit," and subcarriers of a DMT signal are modulated with such G.hn data units using quadrature amplitude modulation (QAM) or some other modulation technique for communication across a shared medium.

G.hn's original design intent was to allow a master and a number of slave stations to share the same medium. This was a sensible choice when all the stations were within one dwelling, under the control of a single user. G.hn is problematic when the master serves slaves in multiple independent dwellings under the control of multiple independent users. Described herein are various ways to enhance G.hn systems to allow slave stations in independent dwellings, while preventing actions within one dwelling from adversely affecting service to another, and maintaining the beneficial low power properties of G.hn. However, the present disclosure is not limited to G.hn, and other protocols may be used in the various embodiments described herein.

FIG. 1 depicts an exemplary embodiment of a communication system 20 implementing a fiber-to-the-DP (FTTDP) architecture. In this regard, a communication network 22 is coupled to a DP 25 via an optical fiber 27. Further, the DP 25 is coupled to a plurality of customer premises (CP) transceivers 33-36 at a plurality of customer premises 38 and 39 via a plurality of subscriber lines 41-44, respectively. In one exemplary embodiment, each subscriber line 41-44 comprises a conductive connection, such as at least one twisted-wire pair. However, any of the subscriber lines 41-44 may comprise another type of connection, such as an optical fiber or a coaxial cable, in other embodiments. As known in the art, subscriber lines (such as the subscriber lines 41-44 shown by FIG. 1) extending between a DP and a customer premises are sometimes referred to as "drop connections," and this terminology for the subscriber lines 41-44 will be used hereafter.

In a downstream direction, the network 22 transmits an optical signal carrying a high-speed data stream across the fiber 27 to the DP 25, which demultiplexer the data stream for communication across the drop connections 41-44. In this regard, the DP 25 respectively transmits data streams across the drop connections 41-44 in which each such data stream comprises a portion of the high-speed data stream transmitted from the network 22. In an upstream direction, each CP transceiver 33-36 transmits a data stream to the DP 25, which multiplexes the data streams from the CP transceivers 33-36 into a high-speed data stream for communication across the fiber 27.

Figure 2:
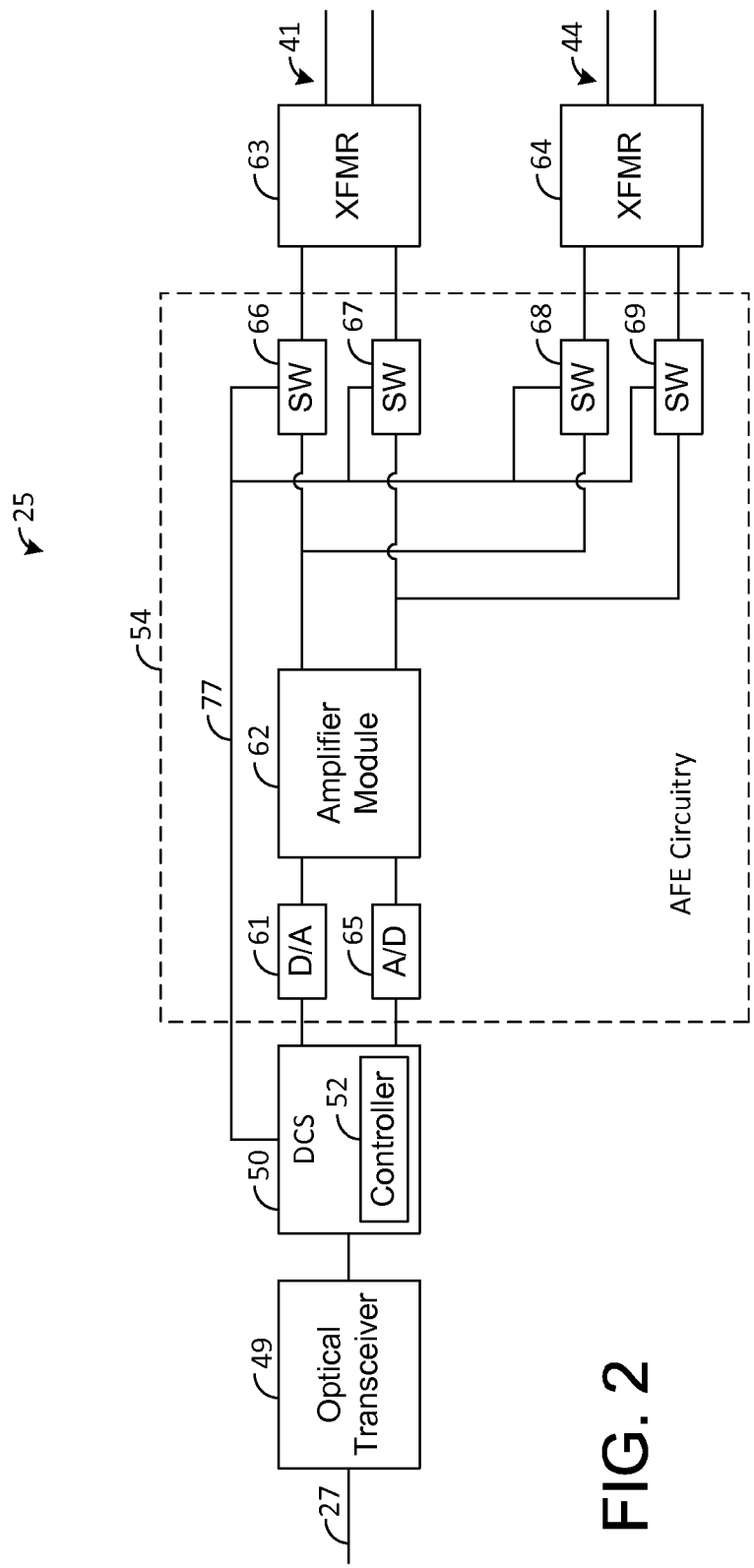
FIG. 2 is a block diagram illustrating an exemplary embodiment of a distribution point (DP) of a communication system, such as is depicted by FIG. 1.

FIG. 2 depicts an exemplary embodiment of the DP 25. As shown by FIG. 2, the DP 25 comprises an optical transceiver 49 that is coupled to the optical fiber 27 on a network side of the DP 25. The optical transceiver 49 is also coupled to a digital control system (DCS) 50 having a controller 52, which is coupled to drop connections 41 and 44 through analog front end (AFE) circuitry 54, as will be described in more detail hereafter. For simplicity of illustration, the controller 52 is shown in FIG. 2 as being coupled to two drop connections 41 and 44, but the controller 52 may be coupled to any number of drop connections in other embodiments. As a mere example, the controller 52 may be similarly coupled to and control communication across all of the drop connections 41-44 shown by FIG. 1, as well as any number of drop connections in addition to the those shown by FIG. 1.

In the exemplary embodiment depicted by FIG. 2, the AFE circuitry 54 comprises a digital-to-analog (D/A) converter 61, an amplifier module 62, an analog-to-digital (A/D) converter 65, and a bank of switches 66-69. The switches 66 and 67 are coupled to a transformer 63, which is coupled to a drop connection 41, and the switches 68 and 69 are coupled to a transformer 64, which is coupled to another drop connection 44. The switches 66-69 are respectively coupled to the controller 52 via a control bus 77, which comprises one or more conductive connections. As will be described in more detail hereafter, the control bus 77 is used to provide control signals from the controller 52 to the switches 66-69.

For example, the controller 52 may transmit a control signal via the control bus 77 to the switch (SW) 66 to control whether the switch 66 is in a closed state or an open state. When in the closed state, the switch 66 allows current to pass. As an example, the switch may form a short circuit electrically coupling the transformer (XFMR) 63 to the amplifier module 62. When in the open state, the switch 66 prevents current from passing. As an example, the switch 66 may form an open circuit electrically isolating the transformer 63 from the amplifier module 62. When both switches 66 and 67 are in the open state, the transformer 63 and, hence, the drop connection 41 are isolated from the amplifier module 62 and, hence, other components, such as controller 52 and other drop connections. Similar to the switch 66, the controller 52 respectively transmits control signals via the control bus 77 to control whether the switches 67-69 are in open states or closed states. Note that a switch may isolate a given drop connection from the DP-side of the switch by electrically separating the drop connection from the DP-side of the switch, as described above, or simply by blocking or otherwise preventing signals and noise from flowing through the switch. Unless otherwise indicated, it will be assumed hereafter that each switch electrically separates its respective drop connection from the DP-side of the switch when in the open state. However, it should be emphasized that other techniques for isolating the drop connections are possible in other embodiments.

Figure 3:
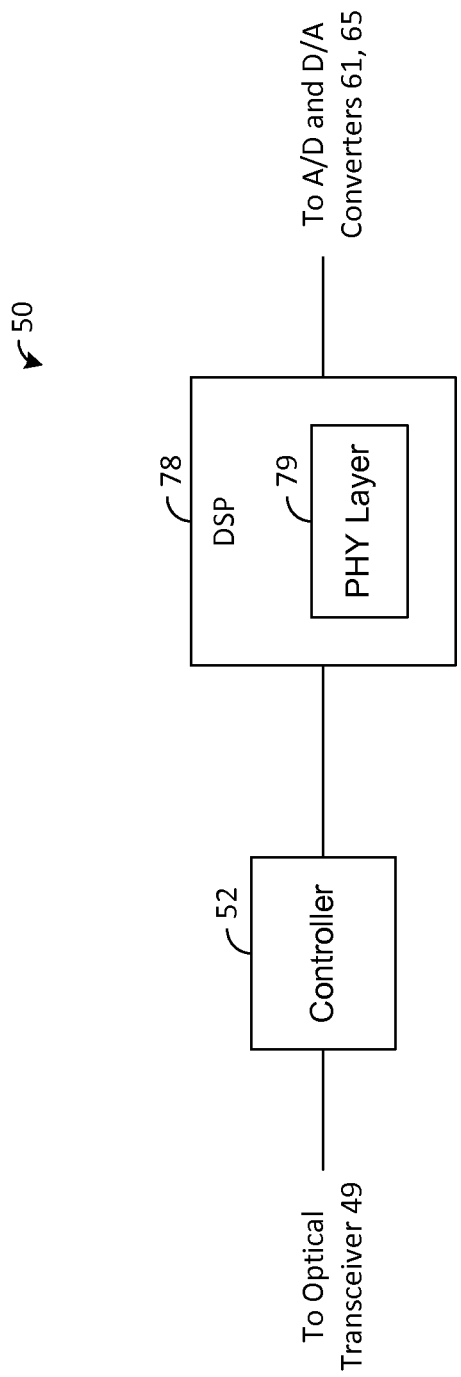
FIG. 3 is a block diagram illustrating an exemplary embodiment of a digital control system, such as is depicted by FIG. 2.

FIG. 3 depicts an exemplary embodiment of the digital control system 50. In the embodiment shown by FIG. 3, the controller 52 is implemented in hardware, such as a field programmable gate array (FPGA), but in other embodiments, the controller 52 may be implemented in hardware, software, firmware, or any combination thereof. As shown by FIG. 3, the controller 52 is coupled to a digital signal processor (DSP) 78 that stores and executes software, referred to herein as physical (PHY) layer 79. In other embodiments, the PHY layer 79 may be implemented in hardware, software, firmware, or any combination thereof. The PHY layer 79 is configured to implement the physical layer (Layer 1) of the ISO/OSI model, as will be described in more detail hereafter.

In addition to the operations described above, the controller 52 also performs traffic scheduling for the drop connections 41 and 44. In this regard, the controller 52 allocates each CP transceiver 33 and 36 (FIG. 1) non-overlapping time slots in which to transmit upstream across the drop connections 41 and 44 in order to provide time division multiplexing of the upstream traffic so that data collisions on the drop connections 41 and 44 are avoided.

In the downstream direction, the optical transceiver 49 (FIG. 2) receives an optical data signal from the fiber 27 and converts the optical data signal into an electrical signal defining digital data frames that are received by the controller 52. The controller 52 is configured to perform Layer 2 operations, such as Layer 2 switching (including unicast, multicast, and broadcast) and Layer 2 bonding, for the received data frames. The controller 52 forwards to the DSP 78 data that is to be transmitted across the drop connections 41 and 44, and the PHY layer 79 encapsulates the data for transmission across such drop connections. In one exemplary embodiment, the Layer 1 encapsulation is according to G.hn protocols, but other types of protocols may be used in other embodiments. For illustrative purposes, it will be assumed hereafter unless otherwise indicated that G.hn is used to communicate in both the upstream and downstream directions, and the data packets communicated across the drop connections will be referred to hereafter as "G.hn data units." In other embodiments, other types of data packets may be communicated across the drop connections via the techniques described herein.

Note that when the drop connection 41 is to carry a particular G.hn data unit, the PHY layer 79 uses the G.hn data unit to encode a digital representation of a DMT signal. In one exemplary embodiment, the DMT subcarriers are modulated via quadrature amplitude modulation (QAM), but other types of modulation techniques are possible in other embodiments. The PHY layer 79 transmits the digital representation of the DMT signal to the D/A converter 61 (FIG. 2), which converts the received signal from digital to analog. Referring to FIG. 2, the amplifier module 62 receives the analog signal from the D/A converter 61 and drives the signal for transmission across one or more drop connections 41 and/or 44, depending on the states of the switches 66-69, as will be further described hereafter.

In the upstream direction, the amplifier module 62 receives from the transformers 63 and 64 DMT signals carrying G.hn data units from one or more customer premises, depending on the states of the switches 66-69. The A/D converter 65 converts each received DMT signal from analog to digital, and the PHY layer 79 (FIG. 3) of the control system 50 decodes the digital representation of the DMT signal to recover the G.hn data units originally encoded at and transmitted from the customer premises. The PHY layer 79 strips G.hn formatting information from the data units to recover the digital data to be transmitted to the network 22 (FIG. 1). The controller 52 combines such recovered digital data from multiple drop connections 41 and 44 to form a high-speed data stream that the optical transceiver 49 converts into an optical data signal for transmission across the fiber 27.

Figure 4:
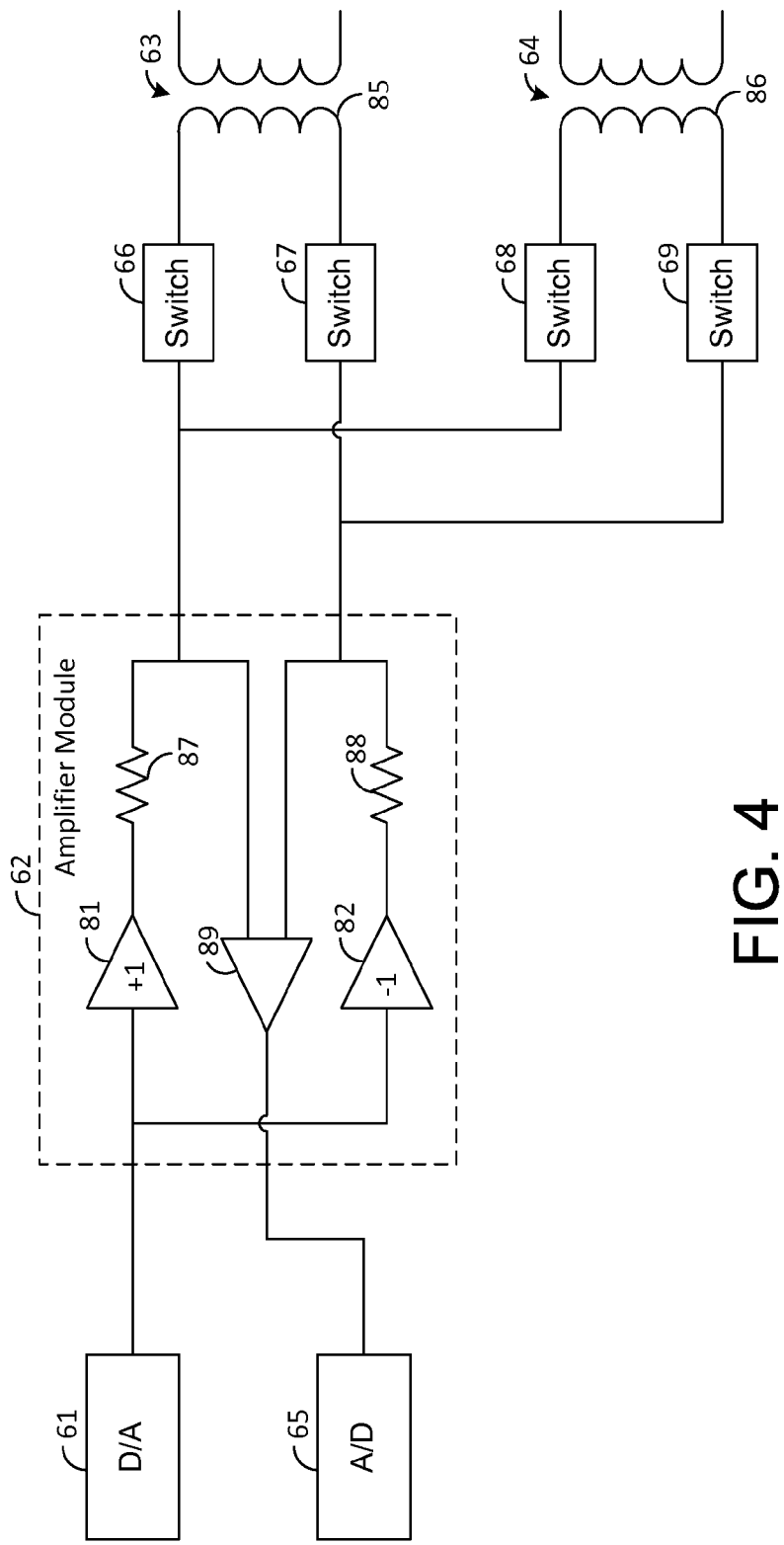
FIG. 4 is a block diagram illustrating an exemplary embodiment of an amplifier module, such as is depicted by FIG. 2.

FIG. 4 depicts an exemplary embodiment of the amplifier module 62. As shown by FIG. 4, the amplifier module 62 comprises a plurality of amplifiers 81 and 82, referred to hereafter as "transmit amplifiers," coupled to the D/A converter 61. The transmit amplifiers 81 and 82 are coupled through resistors 87 and 88, respectively, to opposite ends of a winding 85 of the transformer 63 and opposite ends of a winding 86 of the transformer 64. The transmit amplifier 81 positively amplifies (non-inverting) voltages of the DMT signal received from the D/A converter 61, and the transmit amplifier 82 negatively amplifies (inverting) voltages of the DMT signal received from the D/A converter 61. The amplifier module 62 also comprises an amplifier 89, referred to hereafter as "receive amplifier," having a pair of input terminals respectively coupled to opposite ends of the winding 85, and the receive amplifier 89 has an output terminal coupled to the A/D converter 65.

Referring again to FIG. 2, in one exemplary embodiment, the controller 52 selectively controls the states of the switches 66-69 to isolate one drop connection 41 or 44 from the other when desirable thereby changing over time the impedance seen by the amplifier module 62 when driving signals across a drop connection 41 or 44. In this regard, when the drop connection 41 is to be active (e.g., when the controller 52 is transmitting G.hn data units to be received by the CP transceiver 33 (FIG. 1) coupled to the drop connection 41 or when the controller 52 is expecting to receive data from such CP transceiver 33), the controller 52 closes the switches 66 and 67 via control signals transmitted across the control bus 77 such that the amplifier module 62 is electrically coupled to such drop connection 41. When the drop connection 41 is to be inactive (e.g., when the controller 52 is not transmitting G.hn data units to be received by the CP transceiver 33 (FIG. 1) coupled to the drop connection 41 and when the controller 52 is not expecting to currently receive data from such CP transceiver 33), the controller 52 opens the switches 66 and 67 such that the amplifier module 62 is electrically isolated from the drop connection 41.

In addition, the controller 52 similarly controls the states of the switches 68 and 69 for the drop connection 44. Thus, when the drop connection 44 is to be active, the controller 52 closes the switches 68 and 69 via control signals transmitted across the control bus 77 such that the amplifier module 62 is electrically coupled to such drop connection 44. When the drop connection 44 is to be inactive, the controller 52 opens the switches 68 and 69 such that the amplifier module 62 is electrically isolated from the drop connection 44. Similarly, if a unicast message (e.g., one or more G.hn data units) is to be transmitted to the CP transceiver 36 (FIG. 1) only, then the controller 52 is configured to transition the switches 66 and 67 for the drop connection 41 to the open state and to transition the switches 68 and 69 for the drop connection 44 to the closed state.

Accordingly, at times, the amplifier module 62 is electrically isolated from at least one drop connection 41 or 44 thereby increasing the total impedance seen by the amplifier module 62 between the DP 25 and the customer premises, thereby requiring less power to drive the drop connections. As an example, to transmit a unicast message to the CP transceiver 33 (FIG. 1) only, the controller 52 may be configured to transition the switches 68 and 69 for the drop connection 44 to an open state and to transition the switches 66 and 67 for the drop connection 41 to a closed state. In such case, the amplifier module 62 is electrically coupled to and the unicast message propagates across the drop connection 41 only. That is, the DP 25 only drives the drop connection 41. Thus, the loop impedance is greater than in an embodiment in which both drop connections 41 and 44 are electrically coupled to the amplifier module 62.

To transmit a multicast message to both CP transceivers 33 and 36 (FIG. 1), the controller 52 is configured to close all of the switches 66-69. In such case, the amplifier module 62 is electrically coupled to and the multicast message propagates across both drop connections 41 and 44. That is, the amplifier module 62 drives both drop connections 41 and 44.

The exemplary embodiment shown by FIG. 2 has several advantages, some of which will be described in more detail below. In this regard, as more drop connections are isolated, the portion of the system 20 between the DP 25 and the CP transceivers 33-36 (FIG. 1) transitions closer to a point-to-point transmission architecture thereby realizing some of the benefits for point-to-point transmissions.

As an example, by driving fewer drop connections 41 and 44, such as when transmitting unicast messages, the amplifier module 62 consumes less power relative to an embodiment in which the amplifier module 62 drives all of the drop connections 41 and 44. For systems with a larger number of drop connections, the power savings realized by selectively driving the drop connections generally increase as the number of isolated drop connections increases. Additionally, compared to point-to-point systems, this point-to-multipoint embodiment has a single PHY layer and AFE circuitry for multiple drop connections, consuming substantially less power.

In addition, isolation of drop connections provides immunity from a "babbling transmitter." In this regard, as known in the art, a "babbling transmitter" refers to transmitter circuitry that, due to some error, uncontrollably transmits across the drop connection to which it is coupled. Such a babbling transmitter may be at one of the CP transceivers 33 and 36 (FIG. 1), and the controller 52 is configured to isolate the babbling transmitter from the amplifier module 62 and the other drop connections by opening the switches that are coupled to the babbling transmitter. As an example, if the CP transceiver 33 (FIG. 1) is uncontrollably transmitting across the drop connection 41, the controller 52 is configured to transition the switches 66 and 67 to an open state such that the babbling transmissions by the CP transceiver 33 do not interfere with or otherwise affect the transmissions of the CP transceiver 36.

By driving fewer drop connections 41 and 44 at a time (e.g., one drop connection at a time), a higher data rate can be supported. In this regard, when driving a fewer number of drop connections with the same amplifier module 62, there is more loop impedance and less noise. In addition, it will be easier to tailor the bit-loading for each of the drop connections 41 and 44 individually without compromising the loading amongst the group of the drop connections 41 and 44.

Also, by driving fewer the drop connections 41 and 44 at a time, greater security can be achieved. In this regard, the controller 52 can prevent the data for one customer from being seen by other customers. As an example, by driving only the drop connection 41 to transmit a message to the CP transceiver 33 (FIG. 1) at one customer premises 38, the CP transceiver 36 (FIG. 1) at another customer premises 39 is prevented from receiving the message. Thus, the data is less susceptible to interception or attack.

Driving fewer drop connections 41 and 44 at a time also decreases the size of the radiating structure thereby providing better radio frequency (RF) compatibility. Further, the size of the receiving structure is similarly reduced thereby achieving better RF immunity by reducing interference from RF sources.

Driving fewer drop connections 41 and 44 at a time also reduces crosstalk allowing for higher peak data rates.

The point-to-point benefits described above generally increase as more of the drop connections are isolated. When transmitting multicast messages, such benefits may be reduced. In this regard, if fewer of the drop connections are isolated, a lower overall loop impedance is seen by the amplifier module 62 resulting in a lower signal level for the DMT signals propagating across the drop connections 41 and 44 from the DP 25. Thus, the power required to drive the drop connections increases. However, as with other point-to-multipoint systems, sharing resources at the DP 25 across multiple drop connections provides an efficient design for power consumption. Therefore, as the number of isolated drop connections decreases, the power requirements indeed increase, but the benefits of sharing resources in a point-to-multipoint architecture also increase, thereby providing an efficient design for power consumption relative to the number of drop connections being actively driven. Moreover, the system supports a point-to-multipoint architecture to provide efficient power consumption for when simultaneous communication with a plurality of CP transceivers is desired, but the drop connections can be selectively isolated during certain time periods as communication requirements or schedules permit to realize the benefits associated with point-to-point transmissions.

Figure 5:
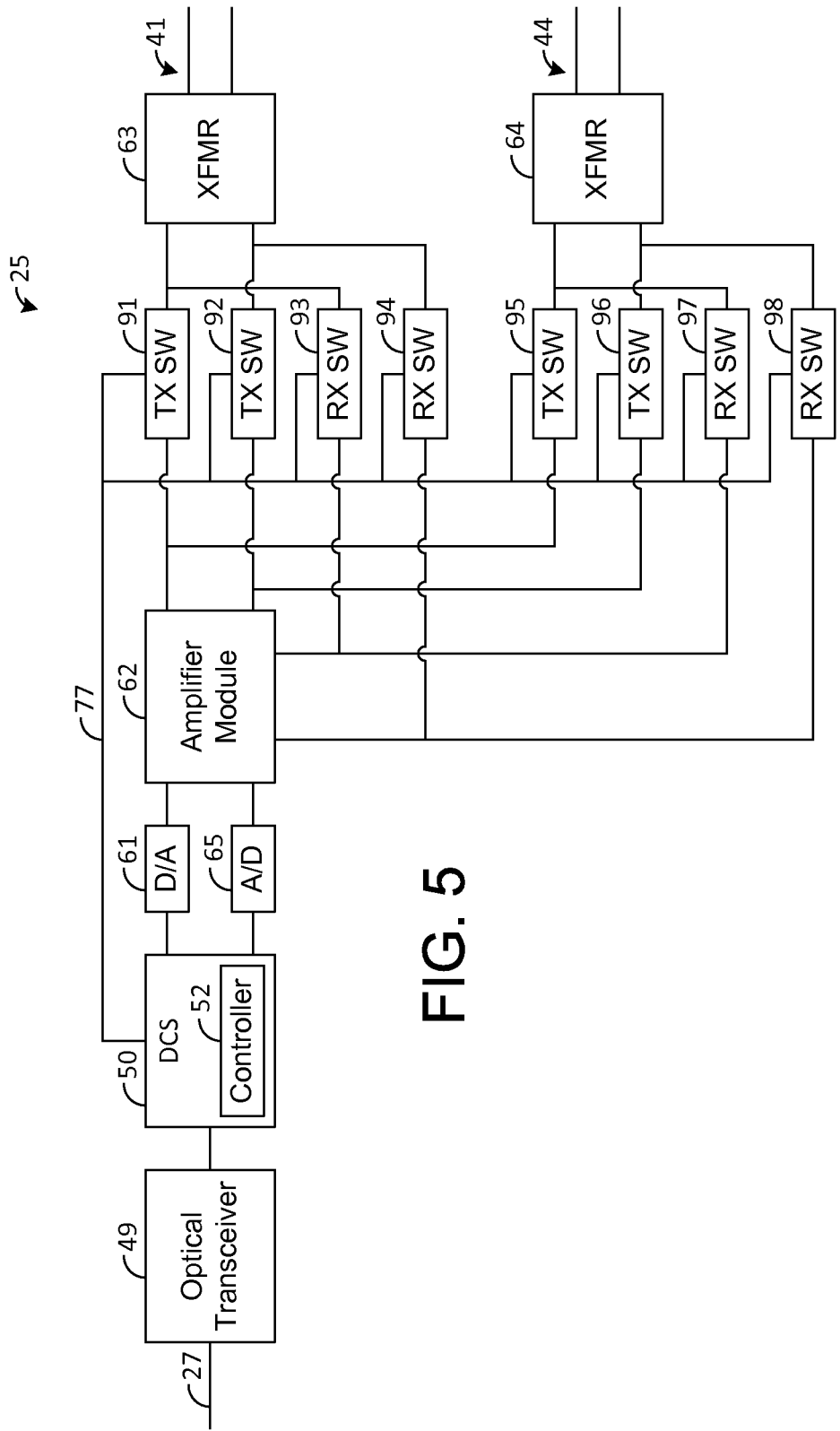
FIG. 5 is a block diagram illustrating an exemplary embodiment of a DP of a communication system, such as is depicted by FIG. 1.
Figure 6:
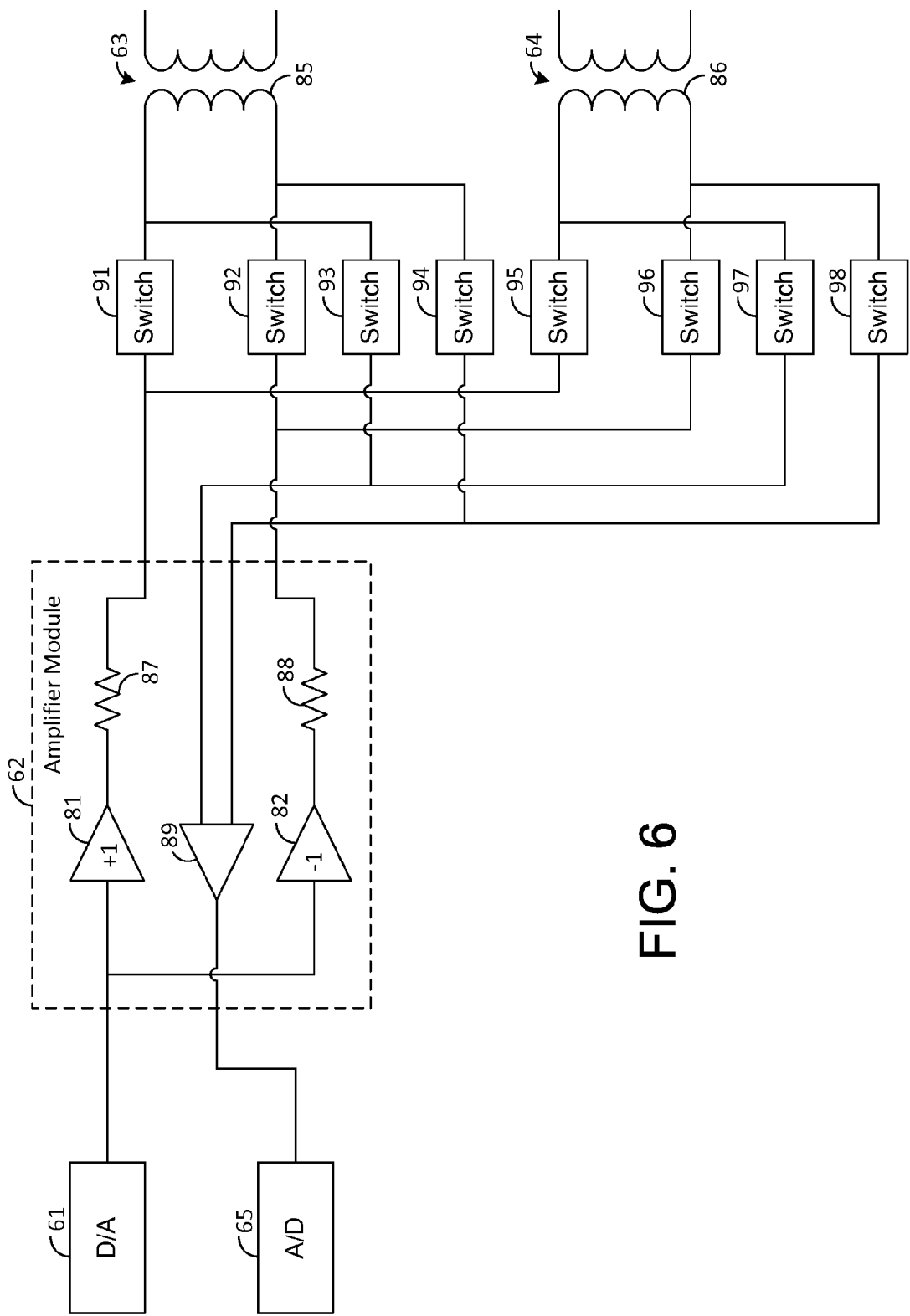
FIG. 6 is a block diagram illustrating an exemplary embodiment of an amplifier module, such as is depicted by FIG. 5.

FIGS. 5 and 6 depict an exemplary embodiment of the DP 25 similar to the one shown by FIGS. 2 and 4 except that the transmitter and receiver buses are separated to provide greater flexibility in an effort to enhance overall throughput. In this regard, as shown by FIG. 6, the DP 25 comprises switches 91 and 92, referred to hereafter as "transmit switches" or "TX SW," that are respectively coupled to the transmit amplifiers 81 and 82 of the amplifier module 62. The transmit switches 91 and 92 are also respectively coupled to opposite ends of the winding 85 of the transformer 63 (FIG. 1). The DP 25 also comprises switches 93 and 94, referred to hereafter as "receive switches" or "RX SW," that are respectively coupled to the input terminals of the receive amplifier 89 and to opposite ends of the winding 85 of the transformer 63 (FIG. 1).

The DP 25 further comprises switches 95-98 that are arranged for drop connection 44 in a manner similar to that for the switches 91-94 coupled to the drop connection 41. In particular, the switches 95 and 96, referred to hereafter as "transmit switches" or "TX SW," are respectively coupled to the transmit amplifiers 81 and 82 of the amplifier module 62. The transmit switches 95 and 96 are also respectively coupled to opposite ends of the winding 86 of the transformer 64 (FIG. 1). In addition, the switches 97 and 98, referred to hereafter as "receive switches" or "RX SW," are respectively coupled to the input terminals of the receive amplifier 89 and to opposite ends of the winding 86 of the transformer 64 (FIG. 1).

The configuration shown by FIGS. 5 and 6 allows the controller 52 to transmit across one drop connection 41 or 44 and to receive from the other drop connection while minimizing the amount of circuitry within the amplifier module 62 that is electrically coupled to the drop connections 41 and 44. As an example, to transmit across the drop connection 41 only while simultaneously receiving from the drop connection 44 only, the controller 52 may transition the switches 93-96 to the open state while transitioning the switches 91, 92, 97, and 98 to the closed state. Thus, the transmit amplifiers 81 and 82 are electrically coupled to only one drop connection 41, and the receive amplifier 89 is electrically coupled to only one drop connection 44. Such configuration allows many of the same advantages described above for the embodiment depicted by FIGS. 2 and 4, such as increasing loop impedance and decreasing noise, while allowing the controller 52 to separately control which channels are used for transmitting and receiving.

Figure 7:
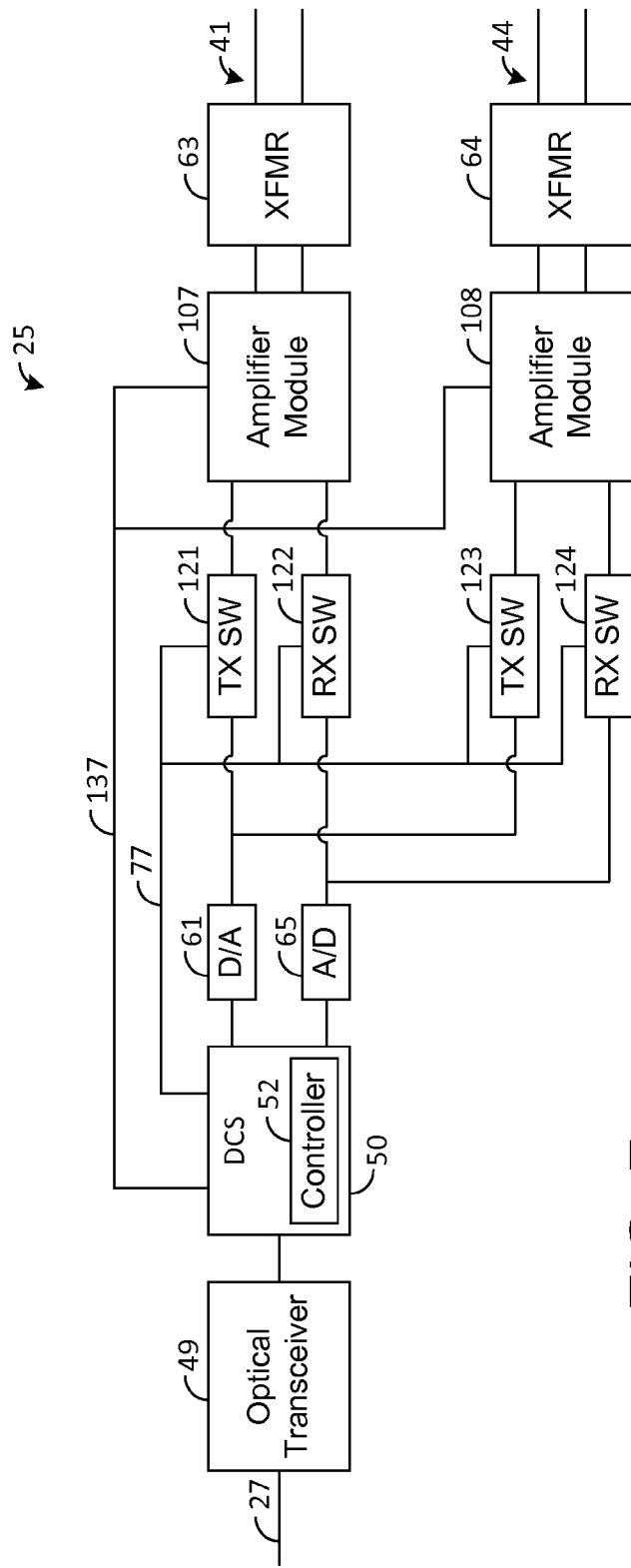
FIG. 7 is a block diagram illustrating an exemplary embodiment of a DP of a communication system, such as is depicted by FIG. 1.
Figure 8:
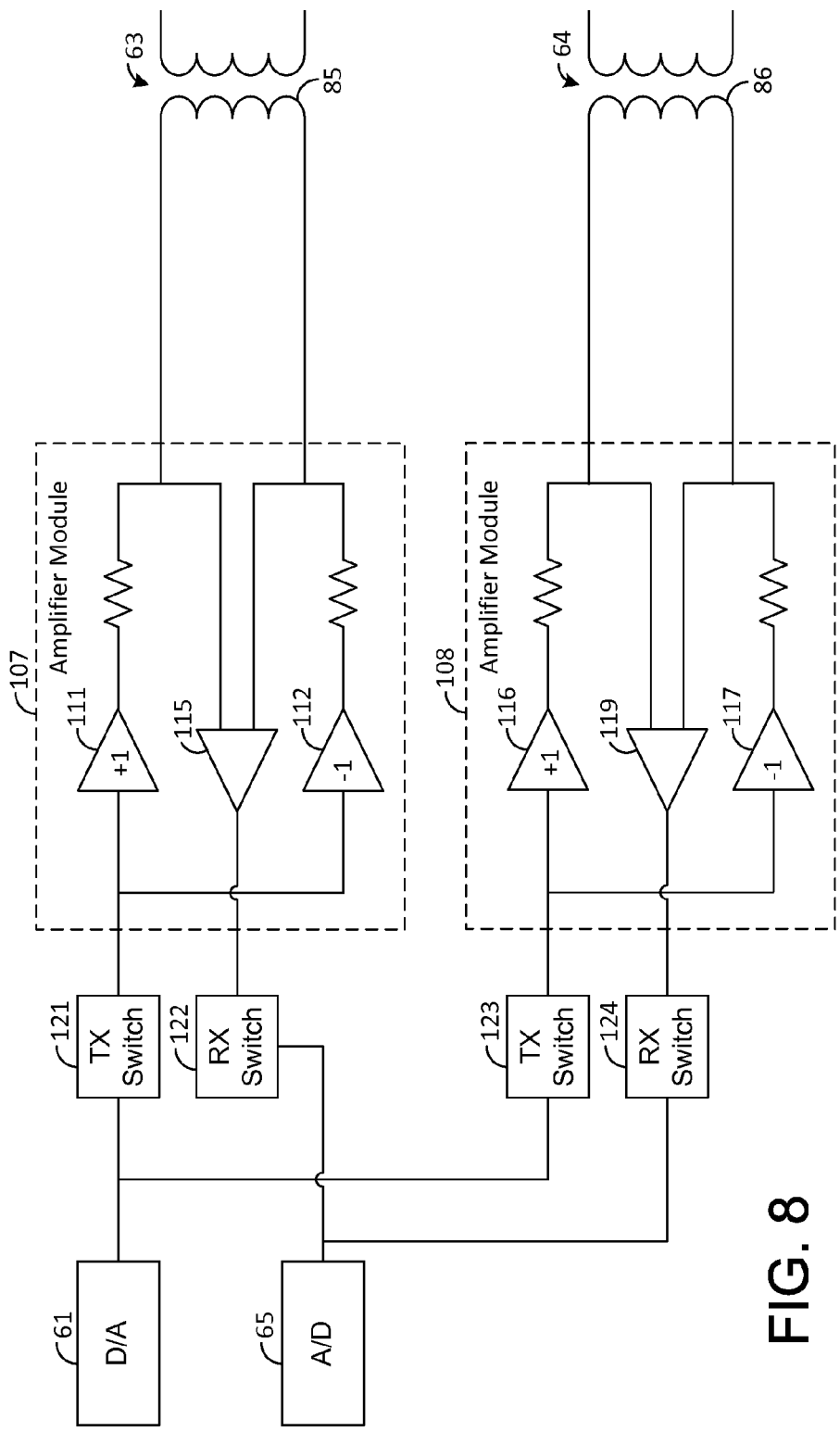
FIG. 8 is a block diagram illustrating an exemplary embodiment of an amplifier module, such as is depicted by FIG. 7.

FIGS. 7 and 8 depict an exemplary embodiment of the DP 25 in which the drop connections 41 and 44 are coupled to separate amplifier modules 107 and 108, respectively. Each amplifier module 107 and 108 is configured similar to the amplifier module 62 of FIG. 4. In this regard, the amplifier module 107 comprises transmit amplifiers 111 and 112 (FIG. 8) coupled to opposite ends of the winding 85 of the transformer 63, and the amplifier module 107 comprises a receive amplifier 115 having input terminals respectively coupled to opposite ends of the winding 85. Similarly, the amplifier module 108 comprises transmit amplifiers 116 and 117 coupled to opposite ends of the winding 86 of the transformer 64 and the amplifier module 108 comprises a receive amplifier 119 having input terminals respectively coupled to opposite ends of the winding 86.

Further, switches 121-124 are coupled between the amplifier modules 107 and 108 and the converters 61 and 65. In this regard, a switch 121 (referred to hereafter as "TX switch") is coupled between the D/A converter 61 and the transmit amplifiers 111 and 112 of the amplifier module 107, and a switch 122 (referred to hereafter as "RX switch") is coupled between the A/D converter 65 and the receive amplifier 115 of the amplifier module 107. In addition, a switch 123 (referred to hereafter as "TX switch") is coupled between the D/A converter 61 and the transmit amplifiers 116 and 117 of the amplifier module 108, and a switch 124 (referred to hereafter as RX switch) is coupled between the A/D converter 65 and the receive amplifier 119 of the amplifier module 108.

The switches 121-124 may be controlled by the controller 52 in the same manner described above for the switches 91-98 of FIG. 5. In particular, the switch 121 may be controlled in the same manner as the switches 91 and 92, and the switch 122 may be controlled in the same manner as the switches 93 and 94. Further, the switch 123 may be controlled in the same manner as the switches 95 and 96, and the switch 124 may be controlled in the same manner as the switches 97 and 98. Thus, to transmit a unicast message across the drop connection 44 while simultaneously receiving a message from the drop connection 41, the controller 52 may close the switches 122 and 123 while opening the switches 121 and 124. To transmit and receive across all drop connections 41 and 44 simultaneously, all of the switches 121-124 may be transitioned to the closed state. In essence, when the controller 52 is to transmit across one or more drop connections 41 and/or 44, the controller 52 closes the TX switch or switches coupled to such drop connection or connections, and the controller 52 opens the TX switch or switches coupled to the drop connection or connections not being used for data transmission. When the controller 52 is to receive from one or more drop connections 41 and/or 44, the controller 52 closes the RX switch or switches coupled to such drop connection or connections, and the controller 52 opens the RX switch or switches coupled to the drop connection or connections not being used for data reception.

As shown by FIG. 7, the switches 121-124 are respectively coupled to the controller 52 via the control bus 77. Further, the amplifier modules 107 and 108 are also coupled to the controller 52 via a control bus 137, which is used to carry control signals from the controller 52. In this regard, if a drop connection 41 or 44 is not being used for data communication in either direction (i.e., if a drop connection 41 or 44 is inactive), then the controller 52 disables the amplifier module 107 or 108 coupled to such drop connection. When disabled, the amplifier module 107 or 108 powers down such that it does not consume electrical power thereby reducing the overall power burden of the DP 25. However, it should be emphasized that powering down amplifier components is unnecessary for all of the embodiments described herein. Even if components of the amplifier modules are not powered down during operation, there still exist significant power savings resulting from the described point-to-multipoint architectures, which generally require less circuitry and, hence, power.

For example, assume that the controller 52 is to simultaneously transmit across and receive from the drop connection 44 without communicating (transmitting or receiving) data across the drop connection 41. In such case, the controller 52 closes the switches 123 and 124 and opens the switches 121 and 122 so that the D/A converter 61 and the A/D converter 65 are electrically coupled to the amplifier module 108 and are electrically isolated from the amplifier module 107. The controller 52 also enables the amplifier module 108 such that its components are powered up and operating, and the controller 52 disables the amplifier module 107 such that its components are powered down and, hence, not consuming electrical power.

Accordingly, the embodiment depicted by FIGS. 7 and 8 allows for separate control of the receive and transmit channels similar to the embodiment depicted by FIGS. 5 and 6. However, fewer switches are implemented in the embodiment depicted by FIGS. 7 and 8. In addition, having separate amplifier modules 107 and 108 increases the number of components at the DP 25 and, hence, likely increases power consumption. However, using a separate amplifier module 107 and 108 for each respective drop connection 41 and 44 prevents or mitigates many of the problems encountered when the DP 25 is simultaneously communicating across multiple drop connections 41 and 44. For example, each amplifier module 107 and 108 should see approximately the same transmit impedance regardless of the number of drop connections 41 and 44 being driven, and driving multiple drop connections for a point-to-multipoint transmission (e.g., a broadcast or multicast) should not cause a corresponding reduction in the signal level of the DMT signals being transmitted, as is the case in the embodiment depicted by FIGS. 5 and 6. In addition, when a drop connection 41 or 44 is not being used for data communication (e.g., in a point-to-point transmission in which only one drop connection 41 or 44 is used for data transmission), the corresponding amplifier module 107 and 108 coupled to such drop connection can be disabled.

Thus, when multiple drop connections 41 and 44 are being driven by the DP 25 for a point-to-multipoint transmission, there is an increase in the power consumed by the DP 25 relative to an embodiment with one amplifier module 62 (FIGS. 2 and 5), but there is also an increase in performance in terms of a higher data rate since the loop impedance seen by each set of amplifier module 107 and 108 is not decreased despite driving multiple drop connections 41 and 44. Further, when only one drop connection 41 or 44 needs to be driven by the DP 25 (e.g., a point-to-point transmission), the amplifier module of the other drop connection can be disabled. Accordingly, when only one drop connection 41 or 44 is being driven, the performance and power consumption of the DP 25 is comparable to the embodiment depicted by FIGS. 5 and 6. In addition, since the same amplifier module 107 or 108 never drives more than one drop connection 41 or 44 in the exemplary embodiment depicted by FIGS. 7 and 8, it is likely that smaller-sized and/or less expensive circuit components may be used to implement the amplifier modules 107 and 108 relative to the amplifier module 62 of FIG. 5. Further, the sensitivity of the receive circuitry (e.g., receive amplifiers 115 and 119) can be better relative to that of the receive circuitry (e.g., receive amplifier 89) of FIG. 6 since each amplifier module 107 and 108 receives from only one respective drop connection.

Note that it is unnecessary for the circuitry used to implements switches 121-124 to be separate from the circuitry that is used to implement the amplifier modules 107 and 108. In this regard, the controller 52 may selectively isolate the drop connections 41 and 44 by adjusting the supply voltage provided to the transmit and receive amplifiers in the amplifier modules 107 and 108. As an example, instead of having a separate switch 122 between the amplifier module 107 and the controller 52, the controller 52 may adjust the supply voltage of the receive amplifier 115 (FIG. 8). When the switch 122 is described above as operating in the closed state, the controller 52 may provide a sufficiently high supply voltage to the receive amplifier 115 so that signals received from the drop connection 41 are appropriately amplified by the receive amplifier 115 for transmission to the A/D converter 65. However, when the switch 122 is described above as operating in the open state, the controller 52 may reduce the supply voltage provided to the receive amplifier 115 so that the signals received from the drop connection are not effectively amplified by the amplifier 115. This has the effect of blocking signals and noise from passing. Similarly, the supply voltages of the transmit amplifiers 111 and 112 may be selectively controlled to block signals from passing when the switch 121 is described above as operating in the open state and to appropriately amplify signals for transmission to the transformer 63 when the switch 121 is described above as operating in the closed state. The supply voltages provided to the transmit and receive amplifiers 116, 117, and 119 of the amplifier module 108 may be similarly controlled such that the amplifier module 108 and the switches 123 and 124 are effectively implemented via the same circuitry.

Figure 9:
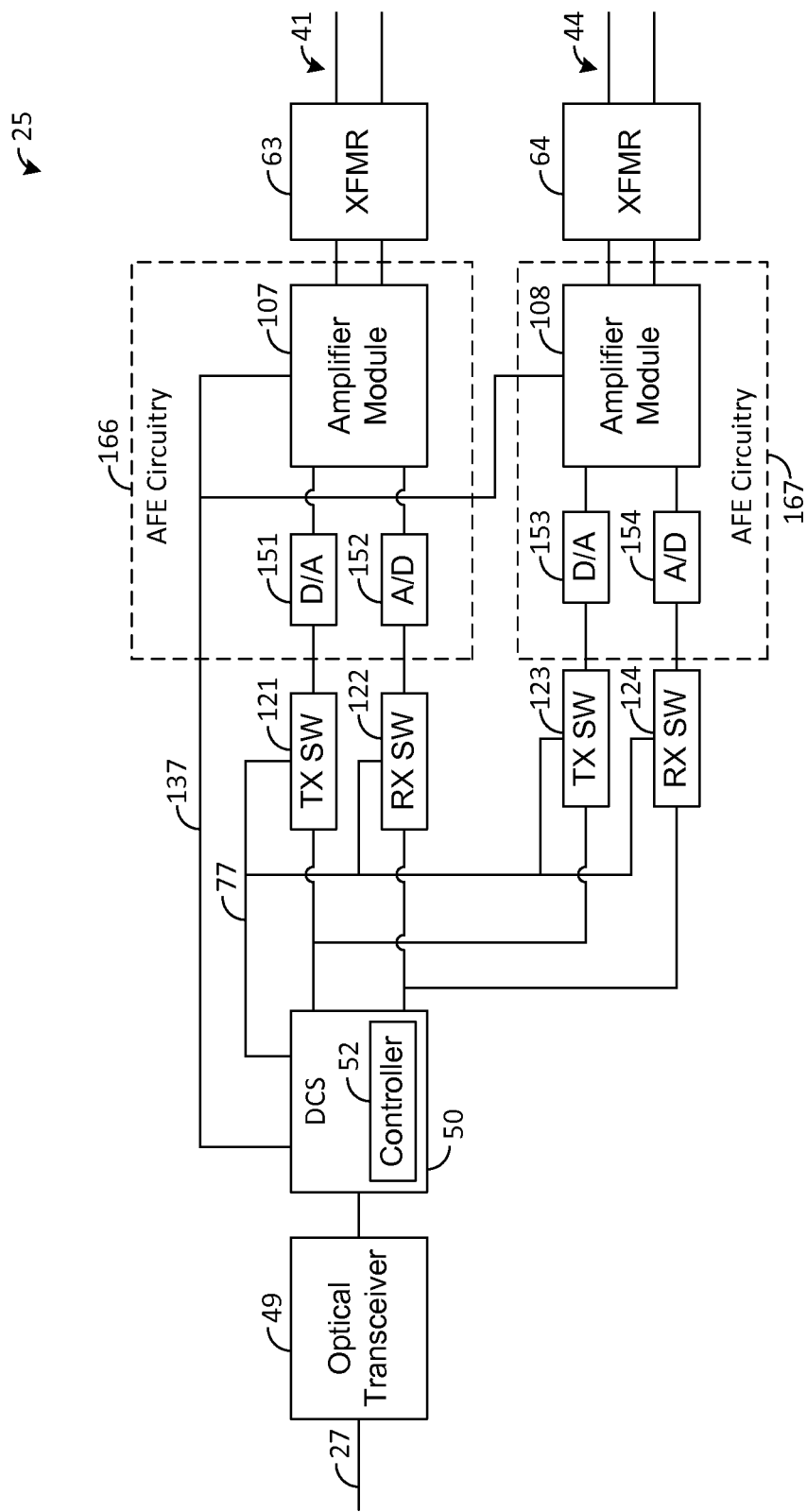
FIG. 9 is a block diagram illustrating an exemplary embodiment of a DP of a communication system, such as is depicted by FIG. 1.

FIG. 9 depicts an exemplary embodiment similar to the embodiment depicted by FIGS. 7 and 8 except that there is a respective D/A converter and a respective A/D converter for each drop connection 41 and 44 and except that the switches 121-124 are moved between the controller 52 and the D/A and A/D converters. In this regard, a D/A converter 151 is coupled between the TX switch 121 and the amplifier module 107, and an A/D converter 152 is coupled between the RX switch 122 and the amplifier module 107. Further, a D/A converter 153 is coupled between the TX switch 123 and the amplifier module 108, and an A/D converter 154 is coupled between the RX switch 124 and the amplifier module 108. In the exemplary embodiment depicted by FIG. 9, the controller 52 is configured to selectively control the switches 121-124 and selectively power down components of the AFE circuitry 160 and 162 according the same techniques described above for the embodiment depicted by FIGS. 7 and 8.

The embodiment shown by FIG. 9 achieves the benefits described above with respect to the embodiment shown by FIG. 7 and may also help to facilitate timing issues with respect to the DMT modulation being performed. Having a separate D/A converter and A/D converter per drop connection 41 and 44, as shown by FIG. 9, allows signal synchronization with the CP transceivers 38 and 39 to be performed separately. For example, analog front end (AFE) circuitry 166 comprising the D/A converter 151, the A/D converter 152, and the amplifier module 107 may be configured to synchronize with the CP transceiver 33 separate from the synchronization between the CP transceiver 36 and the AFE 167 comprising the D/A converter 153, the A/D converter 154, and the amplifier module 108.

Figure 10:
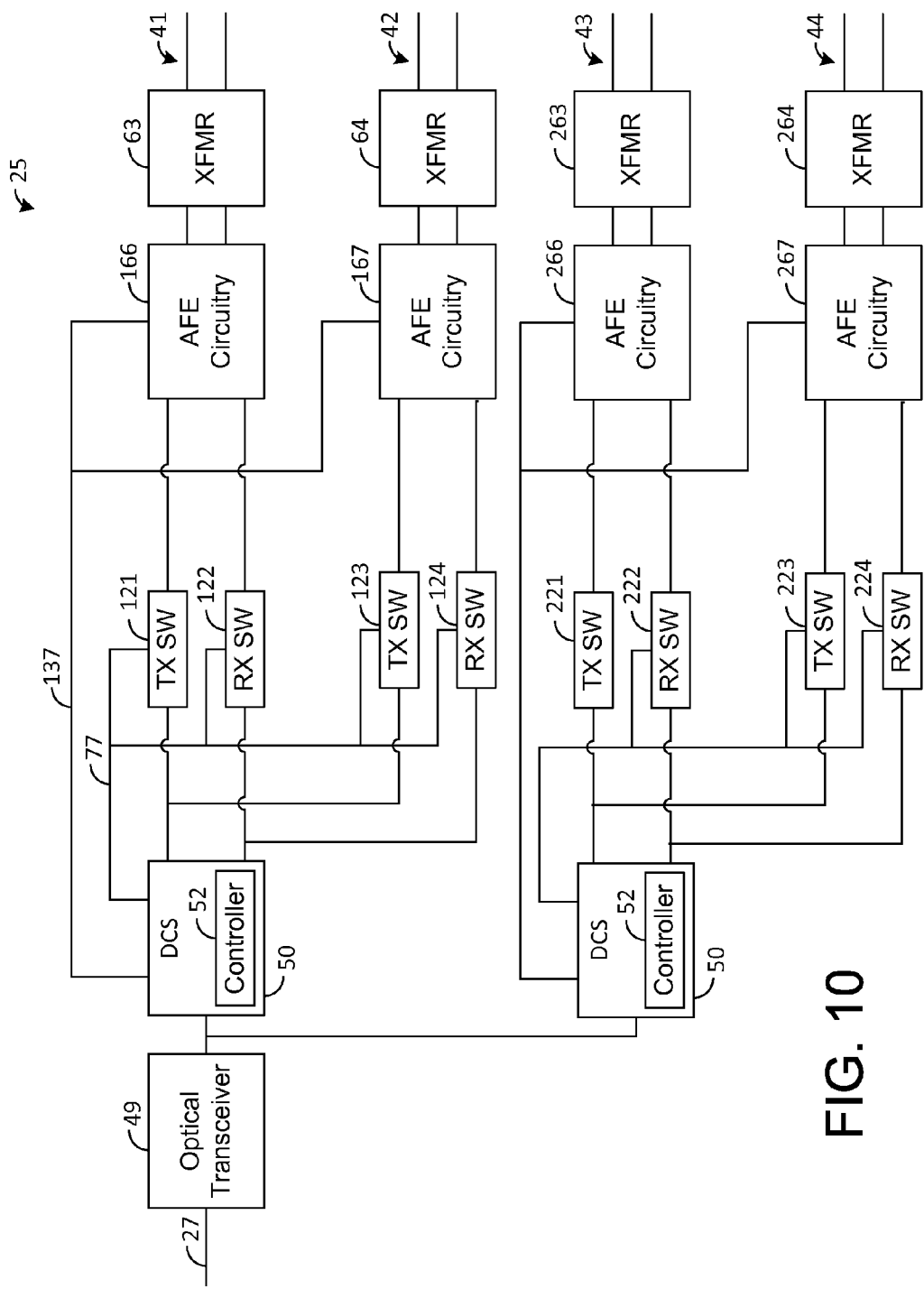
FIG. 10 is a block diagram illustrating an exemplary embodiment of a DP of a communication system, such as is depicted by FIG. 1.

As described above, it should be emphasized that the controller 52 of the digital control system (DCS) 50 may be configured to control communication across any number of drop connections. For example, referring to FIG. 1, it is possible for the same controller 52 to control the communication across all of the drop connections 41-44. Alternatively, multiple controllers 52 may be employed in parallel to service the drop connections 41-44. As an example, one controller 52 may be coupled to and control the communication across drop connections 41 and 42, and another controller 52 may be coupled to and control the communication across drop connections 43 and 44, as shown by FIG. 10. Dividing the control of a plurality of drop connections among a plurality of controllers 52 may help to enhance throughput but may also increase the overall power requirements of the DP 25. Note that FIG. 10 shows the use of multiple controllers 52 for an embodiment similar to that shown by FIG. 9, but multiple controllers 52 may be used for any of the embodiments described herein.

Figure 11:
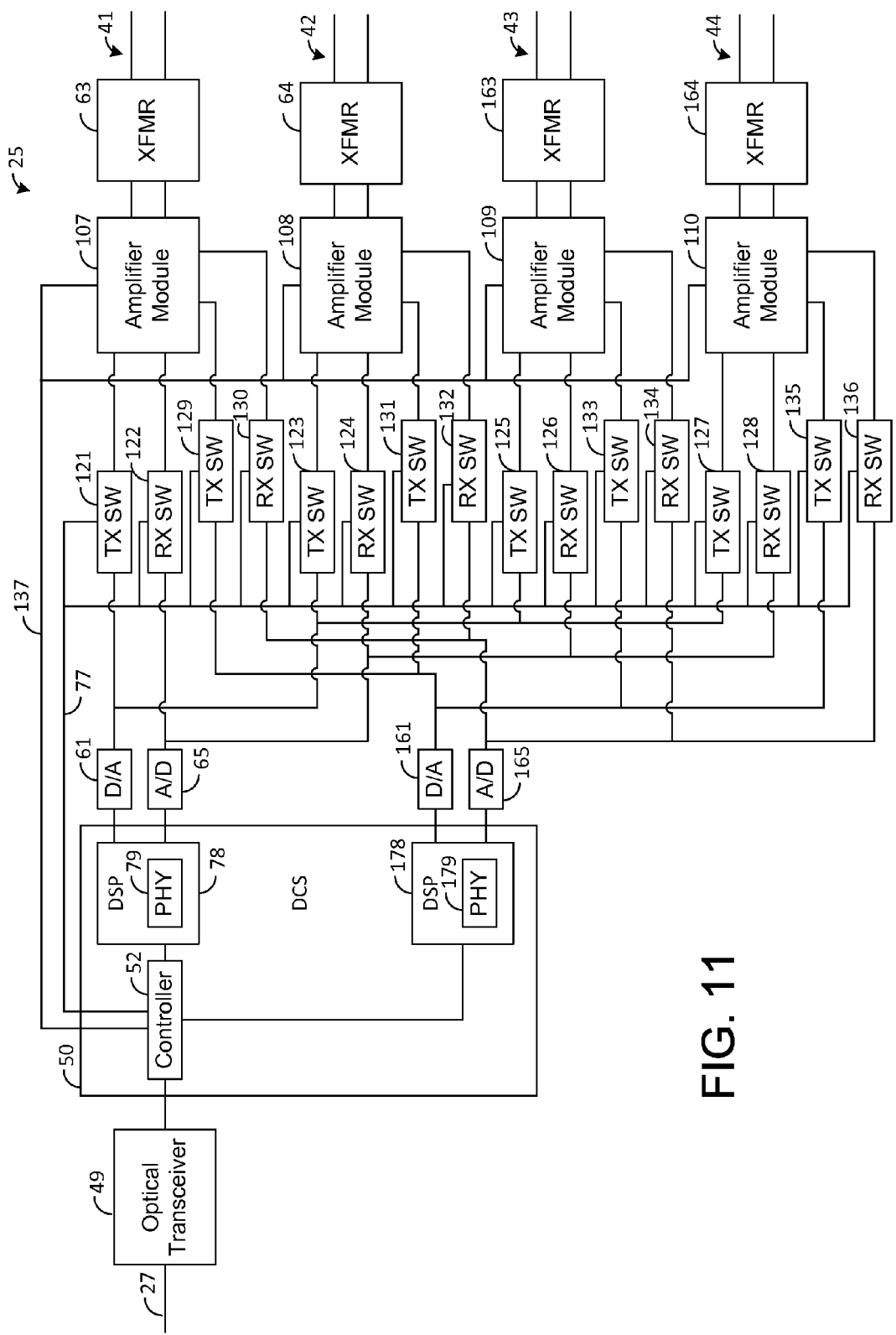
FIG. 11 is a block diagram illustrating an exemplary embodiment of a DP of a communication system, such as is depicted by FIG. 1.

In one exemplary embodiment, as shown by FIG. 11, at least one additional DSP 178 having a PHY layer 179 is used in conjunction with the DSP 78 and PHY layer 79 described above for servicing a plurality of drop connections 41-44. In the downstream direction, the controller 52 is configured to receive data frames from the optical transceiver 49 and to switch the data frames among the DSPs 78 and 178 according to any desired switching algorithm. Thus, data destined for any of the CP transceivers 33-36 (FIG. 1) may be received by any of the DSPs 78 and 178. In the upstream direction, the controller 52 forwards data from any of the DSPs 78 and 178 to the optical transceiver 49.

The embodiment shown by FIG. 11 is similar to the embodiment shown by FIG. 7 except that there are two additional drop connections and an additional DSP, as well as additional circuitry for accommodating the additional drop connections and DSP. Like the embodiment depicted by FIG. 7, DSP 78 is coupled to the D/A converter 61 and the A/D converter 65, which are coupled to a bank of switches. Specifically, the D/A converter 61 is coupled to transmit switches 121, 123, 125, and 127, which are respectively coupled to amplifier modules 107-110, and the A/D converter 65 is coupled to receive switches 122, 124, 126, and 128, which are respectively coupled to amplifiers 107-110. Further, the amplifier modules 107-110 are respectively coupled to drop connections 41-44 through transformers 63, 64, 163, and 164.

The DSP 178 is coupled to each of the drop connections 41-44 via a similar configuration as the DSP 78. Specifically, the DSP 178 is coupled to a D/A converter 161 and an A/D converter 165. The D/A converter 161 is coupled to transmit switches 129, 131, 133, and 135, which are respectively coupled to amplifier modules 107-110, and the A/D converter 165 is coupled to receive switches 130, 132, 134, and 136, which are respectively coupled to amplifiers 107-110. Accordingly, each DSP 78 and 178 may transmit data across any of the drop connections 41-44 and receive data from any of the drop connections 41-44.

Figure 12:
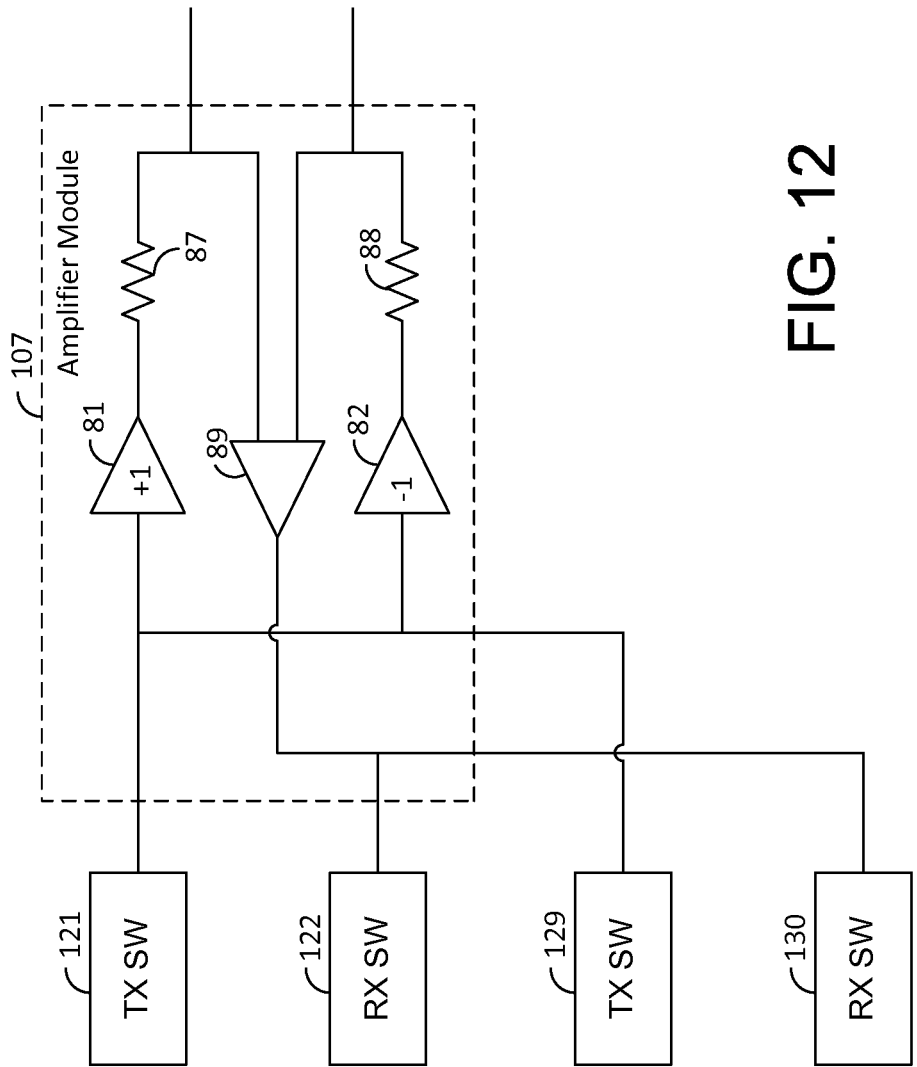
FIG. 12 is a block diagram illustrating an exemplary embodiment of an amplifier module coupled to a group of switches, such as is depicted by FIG. 11.

Note that the switches 129-136 coupled to and servicing the DSP 178 are coupled to the amplifier modules 107-110 in the same manner as the switches 121-128, which are coupled to and servicing the DSP 78. As an example, FIG. 12 shows the switches 121, 122, 129, and 130 coupled to the amplifier module 107. As shown by FIG. 12, both transmit switches 121 and 129 are coupled to the input terminals of transmit amplifiers 81 and 82, and both receive switches 122 and 130 are coupled to the output terminal of the receive amplifier 89. The other amplifier modules 108-110 may be similarly coupled to the switches 123-128 and 131-135.

In one exemplary embodiment, the controller 52 is configured to schedule traffic for each drop connection 41-44, as described in above. Thus, the controller 52 communicates control information with each of the CP transceivers 33-36 and allocates each CP transceiver time slots for upstream traffic. Accordingly, the upstream traffic is time division multiplexed such that data collisions do not occur on the drop connections 41-44. However, as will be described in more detail below, it is possible for multiple upstream messages on different drop connections 41-44 to be isolated from each other so that the time slots for different CP transceivers, at least to an extent depending on the resources at the DP 25, can be overlapping without causing data collisions.

Like the embodiments described above, the controller 52 is configured to control the states of the switches 121-136 depending on the communication that is expected to occur on the drop connections 41-44. Note that there are a variety of message scenarios that can occur in the embodiment depicted by FIG. 11. For example, either DSP 78 or 178 may transmit a unicast or broadcast message across all of the drop connections 41-44. Further, if a DSP 78 or 178 is transmitting across less than all of the drop connections 41-44, then the other DSP 78 or 178 may be configured to simultaneously transmit across the drop connections that are not otherwise carrying downstream traffic. Further, since there are multiple DSPs 78 and 178 separately connected to the amplifier modules 107-110, as shown, then it is possible for multiple CP transceivers 33-36 (FIG. 1) to transmit upstream at the same time.

As an example, assume that during a particular time slot (1) the DSP 78 is to transmit a unicast message across the drop connection 41, (2) the DSP 178 is to transmit a unicast message across the drop connection 42, (3) the CP transceiver 35 is to transmit a message across the drop connection 43, and (4) the CP transceiver 36 is to transmit a message across the drop connection 44. During such time slot, the controller 52 may close transmit switch 121 so that the DSP 78 is enabled to transmit a unicast message across the drop connection 41. Simultaneously, the controller 52 may close transmit switch 131 so that the DSP 178 is enabled to transmit a unicast message across the drop connection 42. Further, the controller 52 may simultaneously close receive switch 126 so that the DSP 78 is enabled to receive the message propagating across the drop connection 43, and the controller 52 may simultaneously close receive switch 136 so the DSP 178 is enabled to receive the message propagating across the drop connection 44. The controller 52 may open the remaining switches 122-125, 127-130, and 132-135 that are not used for the contemplated communication. Further, during the time slot, any amplifiers of the modules 107-110 that are not used for the contemplated communication (e.g., receive amplifier 89 of the amplifier module 107) can be powered down by the controller 52 in order to conserve power.

Note that the use of multiple DSPs may be similarly employed for any of the embodiments described herein. Though the use of multiple DSPs may increase power requirements, system throughput can be increased thereby achieving better performance, such as by allowing multiple messages, at times, to propagate in the same direction across the drop connections 41-44. Further, the embodiment depicted by FIG. 11 provides more flexibility relative to the embodiment depicted by FIG. 10 in that each DSP has access to and may communicate across any of the same drop connections 41-44.

Figure 16:
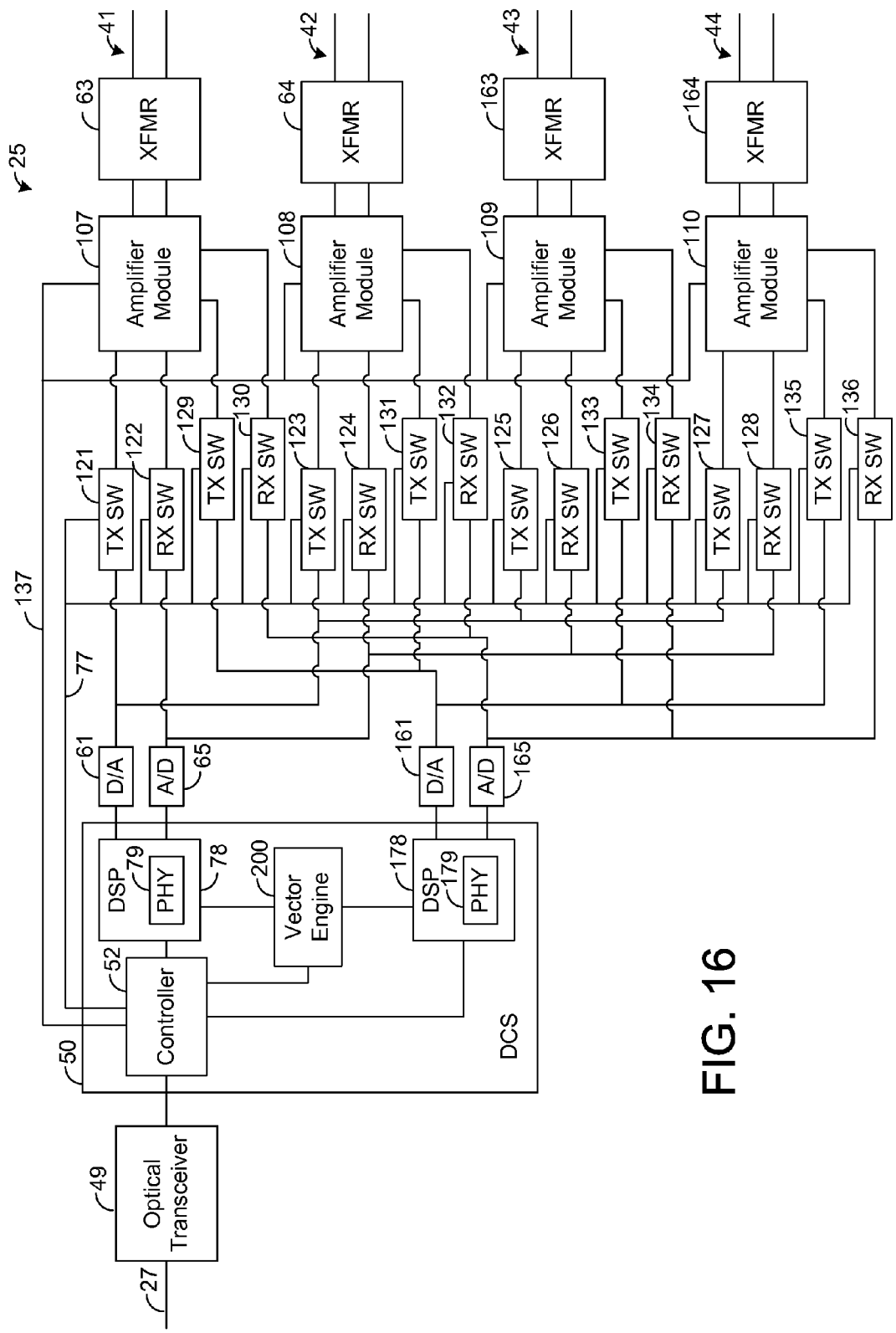
FIG. 16 is a block diagram illustrating an exemplary embodiment of a DP of a communication system, such as is depicted by FIG. 1.

In the embodiment depicted by FIG. 11, it is possible for the signals communicated across the drop connections 41-44 by one DSP to interfere with signals communicated by the other DSP. Such interference is generally referred to as "crosstalk." In one exemplary embodiment, as shown by FIG. 16, the DCS system 50 comprises logic 200, referred to as a "vector engine," for canceling crosstalk affecting the signals communicated by the DSPs 78 and 178. The vector engine 200 may be implemented in hardware, software, firmware, or any combination thereof. In one exemplary embodiment, the vector engine 200 is implemented in software and is stored on and executed by a DSP (not shown in FIG. 16). However, other configurations of the vector engine 200 are possible in other embodiments.

To cancel crosstalk, the vector engine 200 maintains vectoring coefficients respectively corresponding to the coupling functions between interfering tones (i.e., tones that induce crosstalk) and victim tones (i.e., tones affected by crosstalk). In this regard, each victim tone is correlated with a set of vectoring coefficients, and each vectoring coefficient within such correlated set corresponds with a respective interfering tone and indicates the coupling function between such interfering tone and the victim tone. In order to cancel crosstalk induced by an interfering tone from a victim tone, the vector engine accesses the set of vectoring coefficient correlated with the victim tone and, from such set, combines (e.g., multiplies) the interfering tone with the vectoring coefficient corresponding to such interfering tone. The result of such operation provides an estimate of the crosstalk contribution of such interfering tone that has affected (in case the victim tone is being received at the DP 25) or will affect (in case the victim tone is being transmitted from the DP 25) victim tone. The vector engine 200 is configured to combine (e.g., subtract) such estimate with the victim tone in order to compensate the victim tone for the crosstalk effects of the interfering tone. In the case of a victim tone received by the DP 25, combining the crosstalk estimate with the victim tone removes from the victim tone crosstalk induced by the interfering tone. In the case of a victim tone to be transmitted from the DP 25, combining the crosstalk estimate with the victim tone predistorts the victim tone such that crosstalk is effectively canceled from the victim tone as it is propagating to a CP transceiver. Thus, the victim tone arrives at the CP transceiver substantially free of the effects of crosstalk induced by the interfering tone. The process of compensating for crosstalk through the use of vectoring coefficients, as described above, is generally referred to as "vectoring."

After the crosstalk is canceled from the victim tone, the vector engine 200 receives an error signal indicating an amount of error measured for the victim tone. In response, the vector engine 200 updates the vectoring coefficients correlated with such victim tone. Note that the techniques of using coefficients to cancel crosstalk and updating vectoring coefficients are generally well-known. Exemplary techniques for performing crosstalk cancellation and updates to vectoring coefficients are described in commonly-assigned U.S. patent application Ser. No. 13/016,680, entitled "Systems and Methods for Cancelling Crosstalk in Satellite Access Devices" and filed on Jan. 28, 2011, which is incorporated herein by reference.

In the embodiments described herein, the controller 52 has knowledge of which drop connections 41-44 are active and which are inactive. In this regard, as described above the controller 52 schedules upstream transmissions and controls downstream transmissions by controlling the manner and timing of data frames that it sends to the DSPs 78 and 178, as well as by controlling the states of the switches 121-136. Thus, at any given time, the controller 52 is aware of when an upstream and/or downstream message should be propagating across any given drop connection 52.

Using such knowledge, the controller 52 provides inputs to the vector engine 200 that are used by the vector engine 200 to appropriately select the vectoring coefficients to be used in vectoring depending on the communication occurring across the drop connections 41-44. As an example, for a given victim tone that is received or transmitted by the DP 25, the controller 52 preferably transmits to the vector engine 200 data that identifies which drop connections likely propagate interfering tones that affect the victim tone. In response, the vector logic 200 selects the vectoring coefficients corresponding to such interfering tones and uses such coefficients to perform vectoring for the victim tone.

To further illustrate the foregoing, assume that during a given time slot, the controller 52 has scheduled an upstream transmission across drop connection 41 and a simultaneous upstream transmission across drop connection 44. One of the tones for the transmission across the drop connection 41 will be referred to hereafter as the "victim tone." For such victim tone, assume that the vector engine 200 stores three vectoring coefficients corresponding respectively with interfering tones from the drop connections 42-44. However, in the foregoing example, significant crosstalk from the drop connections 42 and 43 should not occur since these connections 42 and 43 do not propagate simultaneous upstream transmissions during the time slot, but crosstalk induced by an interfering tone from the upstream transmission across the drop connection 44 does affect the victim tone.

In the current example, the controller 52 provides data to the vector engine 200 informing the vector engine 200 that an upstream victim tone should be received by the DP 25 from the drop connection 41 during the time slot and that this victim tone should be affected by an interfering tone received from the drop connection 44 during the same time slot. In response, the vector engine 200 performs vectoring to compensate the victim tone for such crosstalk interference. Thus, the vector engine 200 combines the interfering tone from the drop connection 44 with its corresponding vectoring coefficient and combines the result with the victim tone. Further, after receiving an error signal indicating the error in the compensated victim tone, the vector engine 200 updates the foregoing vectoring coefficient.

Note that, in performing vectoring for the victim tone, the vector engine 200 may refrain from using and updating the vectoring coefficients for interfering tones from the drop connections 42 and 43 since these drop connections 42 and 43 should not be carrying interfering tones in the instant example. That is, the vector engine 200 uses the inputs from the controller 52 to select for vectoring only the vectoring coefficient corresponding to the interfering tone propagating across the drop connection 44. In addition, since the drop connections 42 and 42 are not carrying victim tones for the given time slot in the current example, the vector engine 200 may refrain from attempting to perform vectoring operations to cancel crosstalk that otherwise would be affecting tones on these connections 42 and 43. Accordingly, the controller 52 uses the inputs from the controller 52 to intelligently select which vectoring operations to perform as well as which vectoring coefficients should be used in the vectoring operations that are performed.

Figure 13:
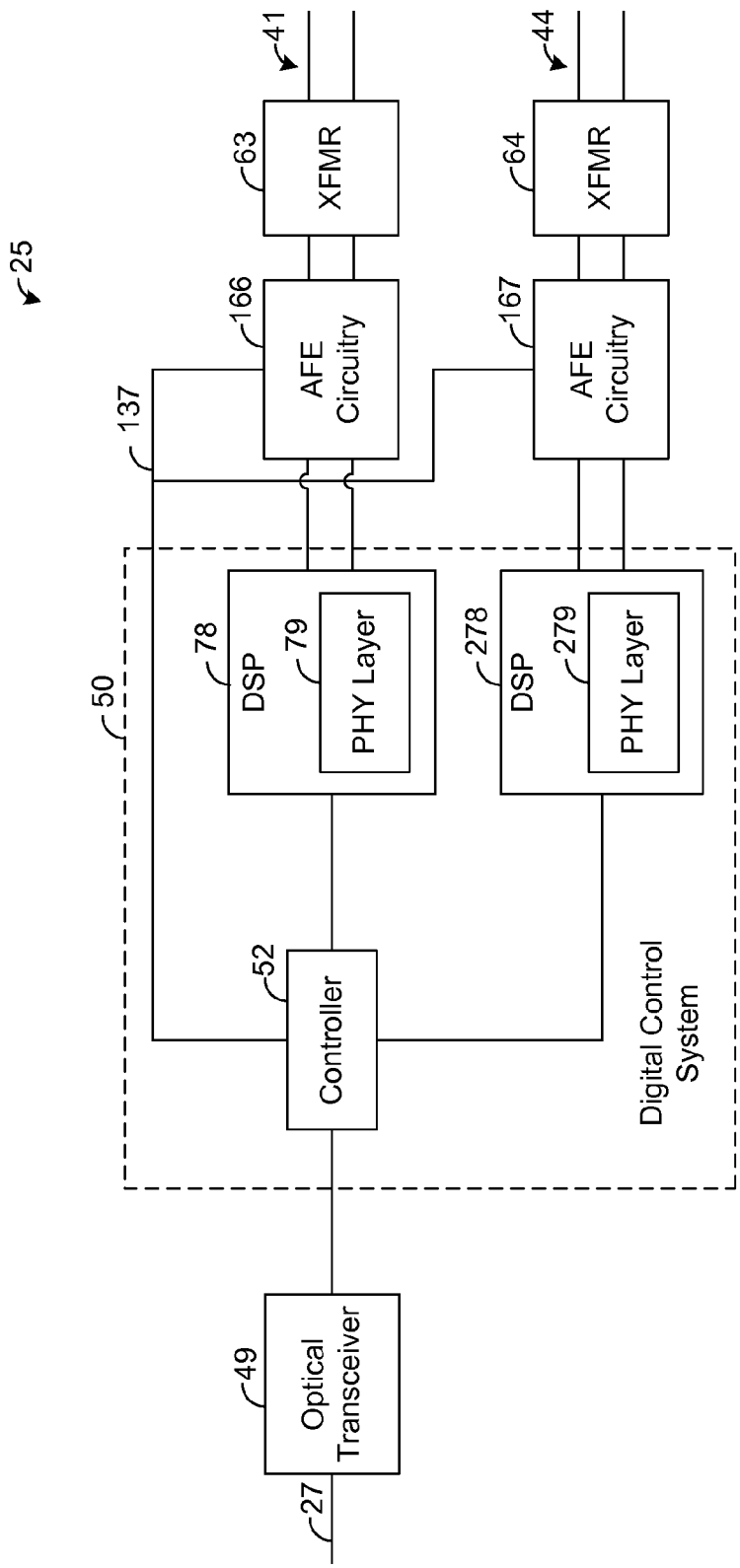
FIG. 13 is a block diagram illustrating an exemplary embodiment of a DP of a communication system, such as is depicted by FIG. 1

FIG. 13 depicts an exemplary embodiment of the digital control system 50 in which the system 50 has multiple DSPs 78 and 278. In particular, the control system 50 has a DSP for each drop connection serviced by it. In the embodiment depicted by FIG. 13, the drop connection 41 is coupled to the DSP 78, which encapsulates and deencapsulates G.hn data units communicated across the drop connection 41, and the drop connection 44 is coupled to the DSP 278, which encapsulates and deencapsulates G.hn data units communicated across the drop connection 44. Such an embodiment defines a point-to-point architecture between the control system 50 and the CP transceivers 33 and 36 (FIG. 1), thereby realizing the benefits described above for point-to-point transmissions. Further, power savings may be realized by powering down components of the AFE circuitry 166 and 167 when such components are not being used for communication. As an example, when there is no data that is being transmitted in the downstream direction across the drop connection 41, the controller 52 may transmit control signals across the bus 137 for powering down the transmit amplifiers 111 and 112 (FIG. 8) of the AFE circuitry 166.

In addition, the controller 52 may be configured to schedule transmissions across the drop connections 41 and 44, as described above. However, since there is a point-to-point architecture and therefore no possibility of data collisions on the drop connections 41 and 44, the time slots allocated to different CP transceivers 33 and 36 may be overlapping. By scheduling upstream transmissions, the controller 52 is aware of when upstream traffic should be propagating across the drop connections 41 and 44. Such information may then be used to selectively power down components of the AFE circuitry 166 and 167. As an example, when there should be no upstream traffic on the drop connection 41, the controller 52 may transmit control signals across the bus 137 for powering down the receive amplifier 115 (FIG. 8).

Figure 14:
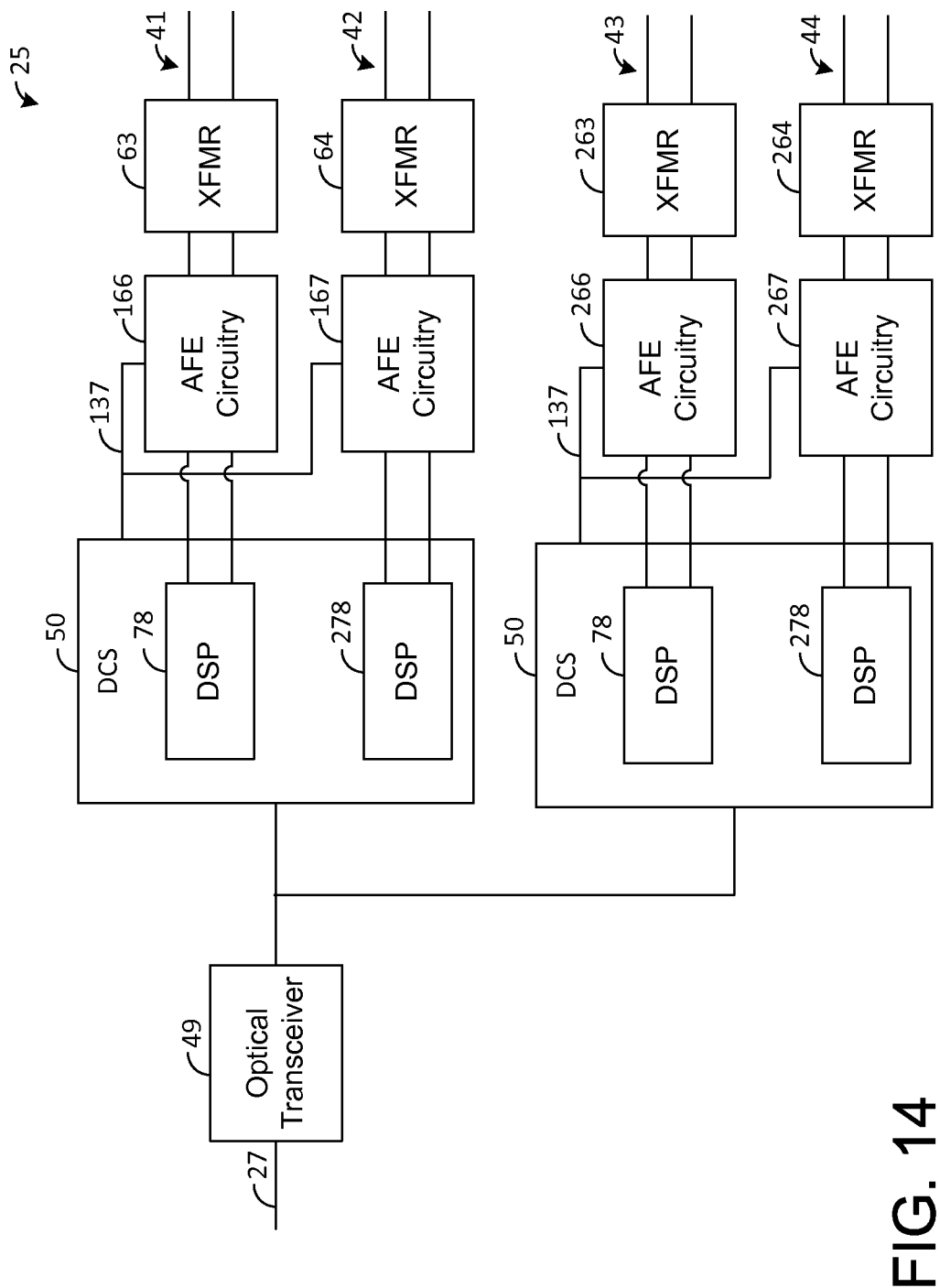
FIG. 14 is a block diagram illustrating an exemplary embodiment of a DP of a communication system, such as is depicted by FIG. 1.

Similar to the embodiment depicted by FIG. 10, multiple control systems 50 according to the multi-DSP configuration of FIG. 13 may be used to separately control different sets of drop connections. FIG. 14 depicts such an embodiment. In the embodiment depicted by FIG. 14, each drop connection 41-44 is coupled to a respective DSP. Specifically, the drop connections 41 and 42 are respectively coupled to DSPs 78 and 278 of one control system 50, and the drop connections 43 and 44 are respectively coupled to DSPs 78 and 278 of another control system 50. Each control system 50 controls communication across the drop connections coupled to it, as described above for the embodiment depicted by FIG. 13.

In any of the embodiments described above, the components of the DP 25 may be backpowered by electrical power from the customer premises 38 and 39. Commonly-assigned U.S. patent application Ser. No. 13/117,918, entitled "Systems and Methods for Powering a Network Access Device Using Customer Premises Equipment" and filed on May 27, 2011, which is incorporated herein by reference, describes exemplary techniques for backpowering a DP from customer premises.

According to current G.hn standards, a heartbeat signal is transmitted among G.hn devices in order to enable and maintain synchronization. In this regard, a G.hn device (referred to hereafter as "master") transmits a heartbeat signal based on the timing of its local clock. The other G.hn devices (referred to hereafter as "slaves") receive the heartbeat signal and adjust their respective local clocks based on the heartbeat signal in an effort to compensate for any timing variations between their local clocks and the clock of the master G.hn device. Moreover, to ensure proper synchronization, each G.hn slave device within a communication group should receive the heartbeat signal from the master G.hn device within a certain time period of the last received heartbeat signal.

In the embodiments described herein, the controller 52 at the DP 25 preferably serves as a master to the CP transceivers. For example, as described above, the controller 52 allocates time periods in which the CP transceivers are permitted to transmit in the upstream direction, and the controller 52 uses such allocations to control switch states. The controller 52 also controls synchronization by transmitting heartbeat signals to the CP transceivers 33 and 36 per G.hn standards.

However, in the architectures described herein, there are times when communication across a given drop connection may not be possible depending on the states of the switches at the DP 25. As an example, referring to FIG. 5, when the controller 52 is transmitting unicast messages to the CP transceiver 36 (FIG. 1) via the drop connection 44, the switches 91 and 92 (FIGS. 5 and 6) may be in the open state such that the signals transmitted by the amplifier module 62 do not propagate across the drop connection 41. Thus, any heartbeat signals transmitted while the switches 91 and 92 are in such a state will not be received by the CP transceiver 33. If a given CP transceiver 33 or 36 misses one or more heartbeat signals, it is possible for the CP transceiver 33 or 36 to lose synchronization depending on the amount of time that lapses between the successive heartbeat signals successfully received by the CP transceiver and the timing variations between the local clock of the CP transceiver and the local clock of the controller 52.

In one exemplary embodiment, the controller 52 is configured to ensure that each CP transceiver receives a heartbeat signal in a timely manner so that synchronization can be reliably maintained. As an example, the controller 52 may be configured to periodically broadcast a heartbeat signal to all of the CP transceivers. In the embodiment shown by FIG. 5, the controller 52 is configured to periodically close all of the TX switches 91, 92, 95, and 96 when it determines that it is time to broadcast a heartbeat signal, and the controller 52 then transmits a heartbeat signal once all of the TX switches 91, 92, 95, and 96 have been closed. After transmission of the heartbeat signal, the switches 91, 92, 95, and 96 may be returned to their respective states prior to the broadcast and/or transitioned to any desired state. By periodically broadcasting the heartbeat signals, the controller 52 can ensure that each CP transceiver 33 and 36 timely receives heartbeat signals to prevent loss of synchronization. Similar techniques may be employed in other embodiments to ensure that each CP transceiver receives each G.hn heartbeat signal.

In the embodiments described above, the controller 52 is described as controlling the states of switches based on when communication is expected to occur across given drop connections. Further, in several embodiments, the controller 52 is described as scheduling upstream transmissions such that the controller 52 is aware when upstream traffic should be on a given drop connection. However, other techniques for determine when communication is to occur on a given drop connection. As an example, it is possible to detect when communication is occurring on a given drop connection and then to make decisions about the state of a switch coupled to such drop connection based on the presence of data.

Figure 15:
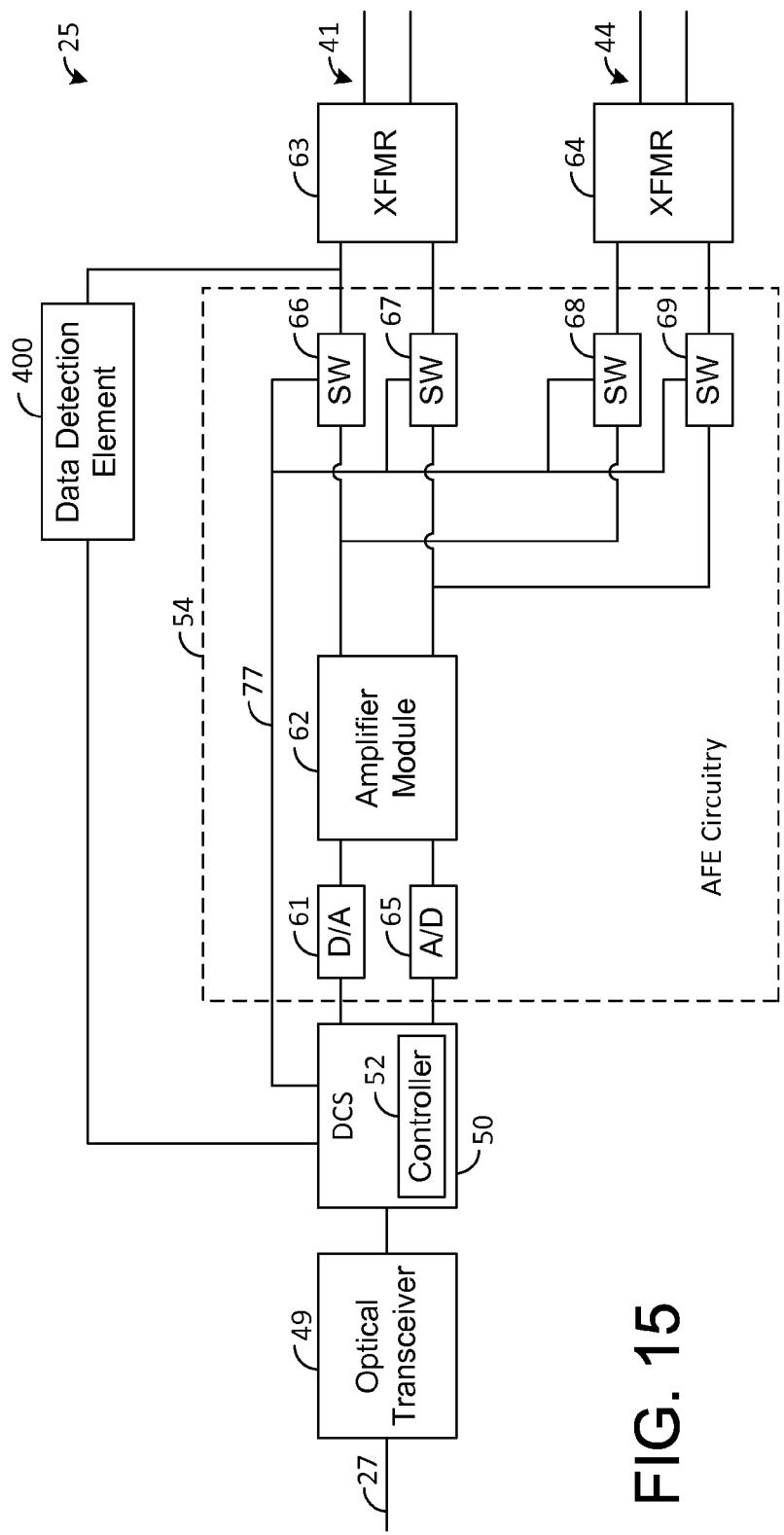
FIG. 15 is a block diagram illustrating an exemplary embodiment of a DP of a communication system, such as is depicted by FIG. 1.

As an example, refer to FIG. 15, which depicts an embodiment similar to the one shown by FIG. 2. In the exemplary embodiment shown by FIG. 2, a data detection element 400 is coupled to the drop connection. Specifically, the data detection element 400 is coupled in parallel to the switches 66 and 67. In one exemplary embodiment, the element 400 is configured sense a voltage between the switch 66 and the transformer 63 and to detect data when the voltage exceeds a threshold. Other techniques for detecting data are possible in other embodiments, and other locations of the element 400 are also possible.

When the data detection element 400 detects data, the element 400 notifies the controller 52, which can then determine how to control the switches 66 and 67 based on such notification. As an example, if the element 400 detects data, the controller 52 may be configured to close the switches 66 and 67. If there is no data detected and if the controller 52 is not transmitting across the drop in the downstream direction, then the controller 52 may be configured to open the switches 66 and 67. Similar techniques may be used in any of the other embodiments to determine when traffic is propagating across a drop connection and to then control a state of one or more switches, as appropriate, based on the determination.

As described above, FIG. 16 depicts an embodiment in which crosstalk is canceled by a vector engine 200. In other embodiments, it is possible to avoid crosstalk without attempting to cancel it, thereby avoiding complex vectoring operations while achieving high peak data rates. For example, it is possible to avoid crosstalk via scheduling so that the transmissions across one drop connection do not overlap with transmissions across another drop connection.

In this regard, refer again to FIG. 13, which as described above illustrates a point-to-point architecture where there is a respective DSP and PHY layer for each drop connection 41 and 44. In one exemplary embodiment, the controller 52 is configured to dynamically schedule upstream and downstream transmissions such that, for at least a period of time in each frame, the controller 52 ensures that the transmissions across the drop connection 41 are prevented from overlapping in time or, more specifically, occupying the same time slots as the transmissions across the drop connection 44, as will be described in more detail hereafter. In such case, any crosstalk that couples from the drop connection 41 to the drop connection 44 should not interfere with data communicated across the drop connection 44 since such data is not transmitted during the occurrence of such crosstalk. Similarly, any crosstalk that couples from the drop connection 44 to the drop connection 41 should not interfere with data communicated across the drop connection 41 since such data is not transmitted during the occurrence of such crosstalk.

Figure 17:
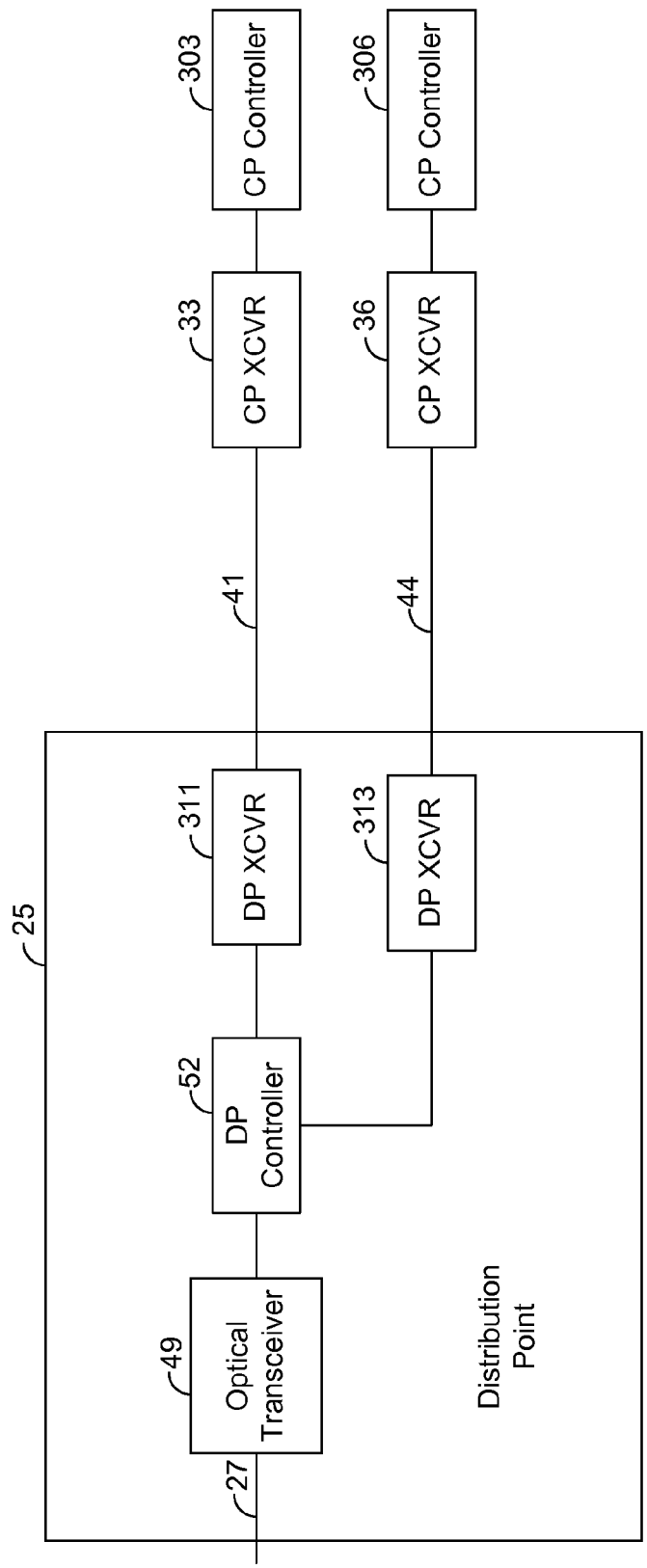
FIG. 17 is a block diagram illustrating an exemplary embodiment of a DP, such as is depicted by FIG. 13, coupled to a plurality of CP transceivers.

FIG. 17 shows the DP 25 of FIG. 13 connected to CP transceivers 33 and 36 via drop connections 41, which are bound within the same binder (e.g., cable) for at least a portion of the distance from the DP 25. As described above with reference to FIG. 13, each of the drop connections 41 and 44 is a point-to-point connection having a respective transceiver at each end. As shown by FIG. 17, the CP transceivers 33 and 35 are coupled to CP controllers 303 and 306, respectively, for controlling such transceivers 33 and 36, as will be described in more detail hereafter. For simplicity of illustration, FIG. 17 shows only two drop connections 41 and 44, but there may be any number of drop connections with similarly configured CP and/or DP transceivers in other embodiments. Note that multiple CP transceivers (e.g., CP transceivers at the same customer premises) may be coupled to and controlled by the same CP controller, if desired.

In FIG. 17, the controller 52 (which will be referred to hereafter as "DP controller") is shown as being coupled to DP transceivers 311 and 313. Referring to FIGS. 13 and 17, the DP transceiver 311 comprises the DSP 78, the AFE circuitry 166, and the transformer 63, and the DP transceiver 313 comprises the DSP 278, the AFE circuitry 167, and the transformer 64. However, in other embodiments, other configurations of the DP transceivers 311 and 313 are possible.

Figure 18:
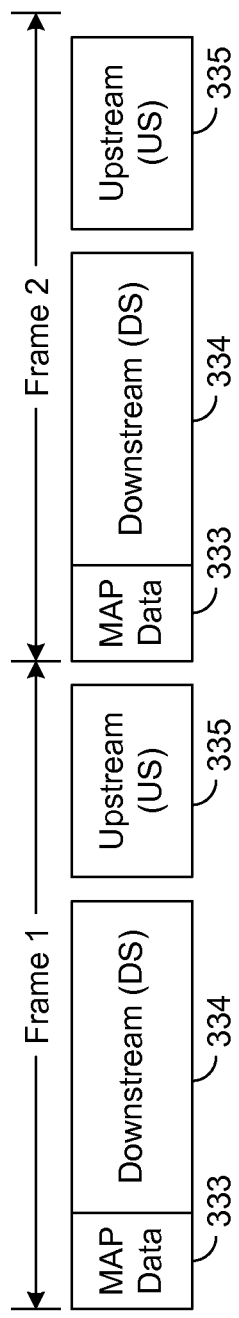
FIG. 18 illustrates an exemplary framing format for communication system, such as is depicted by FIG. 1.

FIG. 18 illustrates an exemplary framing format that may be used for scheduling transmissions across drop connections. In this regard, each frame starts with one or more time slots 333 for the transmission of control information, referred to herein as "MAP data," that indicates the structure of the remainder of the frame. Specifically, the MAP data defines a media access plan (MAP) indicating how each of the remaining time slots of the frame is allocated, as will be described in more detail hereafter. The MAP data is transmitted at a fixed interval, such as every 1 millisecond (ms) or some other unit of time and also may be used for maintaining synchronization among the CP and DP transceivers of the system. In one embodiment, the MAP data is defined by the DP controller 52 and is transmitted downstream across the drop connections 41 and 44. The MAP data time slots 333 overlap for the drop connections 41 and 44, such that each drop connection 41 and 44 carries MAP data at the same time, although it is possible for MAP data to be transmitted at different times for different drop connections in other embodiments.

Following the MAP data time slots 333 are time slots 334 for the transmission of downstream data. As will be described in more detail hereafter, each downstream time slot is allocated to only one DP transceiver 311 or 313 so that only one drop connection 41 or 44 carries data during such time slot. Since the time slots 333 and 334 are both downstream, it is unnecessary for a gap to exist between the end of the MAP data time slots 333 and the beginning of the downstream time slots 334. That is, the first downstream time slot 334 immediately following the last MAP data time slot 333 of a given frame may be allocated to a DP transceiver 311 or 313 without causing a data collision.

Following the downstream time slots 334 are time slots 335 for the transmission of upstream data. As will be described in more detail hereafter, each upstream time slot is allocated to only one CP transceiver 33 or 36 so that only one drop connection 41 or 44 carries data during such time slot. Since there is a switch from downstream communication to upstream communication, it is desirable for a gap of unallocated time to exist between the downstream time slots 334 and the upstream time slots 335. That is, it is desirable for there to be a sufficiently large gap between the last downstream time slot 334 and the first upstream time slot 335 for a given frame to ensure avoidance of data collisions. In this regard, there exists a propagation delay between the transmission of a symbol and its reception, and there should be a sufficiently large gap to allow all of the data transmitted during the downstream time slots 334 to reach the CP transceivers before upstream transmissions are allowed.

Following the upstream time slots 335 is the beginning of a new frame and, hence, the transmission of MAP data for the next frame. Since there is a switch from upstream communication to downstream communication, it is desirable for a gap of unallocated time to exist between the upstream time slots 335 and time slots 333 for the MAP data of the next frame. That is, it is desirable for there to be a sufficiently large gap between the last upstream time slot 335 for a given frame and the first MAP data time slot 333 for the next frame to ensure avoidance of data collisions. In particular, there should be a sufficiently large gap to allow all of the data transmitted during the upstream time slots 335 to reach the DP transceivers before the start of the next frame.

For each frame, it is generally desirable to group all of the downstream time slots together with no intervening upstream time slots and to group all of the upstream time slots together with no intervening downstream time slots, as shown by the exemplary framing format of FIG. 18, in order to minimize the periods of unallocated gaps that are required when transmission is switched between upstream and downstream. Further, since the MAP data is communicated downstream, it is generally desirable for the downstream time slots 334 to immediately follow the MAP data time slots 333 for similar reasons. However, it is possible to have a different order of the time slots, if desired.

It should be noted that the framing format is flexible in that it is unnecessary for the same time slot in each frame to be allocated the same way. In this regard, for each frame, the scheduling is indicated by the MAP data thereby allowing the scheduling to change from frame-to-frame. Based on the MAP data, the CP controllers 303 and 306 dynamically learn the time slots that are allocated to the CP transceivers under its control and permits any such CP transceiver to transmit upstream only during the upstream time slots that are allocated to it. Each CP and DP transceiver is preferably controlled such it is transmits across its respective drop connection only during time slots that are allocated to such transceiver. If desired, components of a particular transceiver, such as its AFE circuitry or DSP, may be powered down (e.g., put to sleep) during periods when the transceiver is not scheduled to be transmitting or receiving as indicated by the MAP data.

Since the scheduling is flexible, more time slots may be allocated to a given transceiver during one frame relative to another frame. Thus, the DP controller 52 may be configured to dynamically manage traffic flows to accommodate congestion and prioritization as may be desired.

In one exemplary embodiment, the MAP data transmitted across a given drop connection is unique to such drop connection and indicates the allocation of time slots for the transceivers that are coupled to the same drop connection. As an example, referring to FIG. 17, the MAP data transmitted across the drop connection 41 indicates the scheduling for the transceivers 33 and 311, and the MAP data transmitted across the drop connection 44 indicates the scheduling for the transceivers 36 and 313.

Note that there are various techniques and algorithms that may be used to indicate the scheduling. As an example, in one embodiment, the MAP data transmitted across a drop connection includes a two bit value, referred to hereafter as "slot indicator," for each time slot (although the slot indicator may have other numbers of bits in other embodiments). If the corresponding time slot is allocated for downstream transmission, the DP controller 52 sets the slot indicator to a particular value (e.g., "00"). If the corresponding time slot is allocated for upstream transmission, the controller sets the slot indicator to another value (e.g., "01"). If the corresponding time slot is not allocated for either upstream or downstream transmission, the DP controller 52 sets the slot indicator to yet another value (e.g., "11"). Thus, for each drop connection 41 and 44, the MAP data transmitted across such drop connection can be analyzed to determine which time slots for the remainder of the frame have been allocated to the DP and CP transceivers coupled to and communicate across the drop connection.

Figure 19:
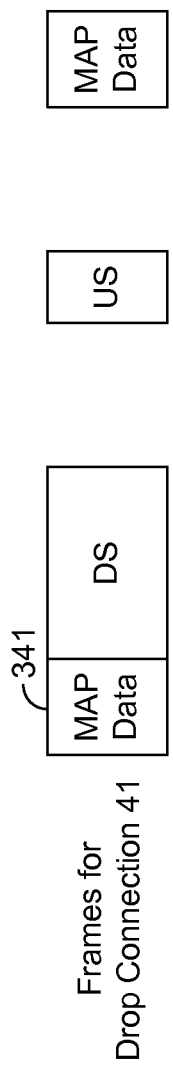
FIG. 19 illustrates art exemplary framing structure for the DP and the CP transceivers depicted by FIG. 17.
Figure 19:
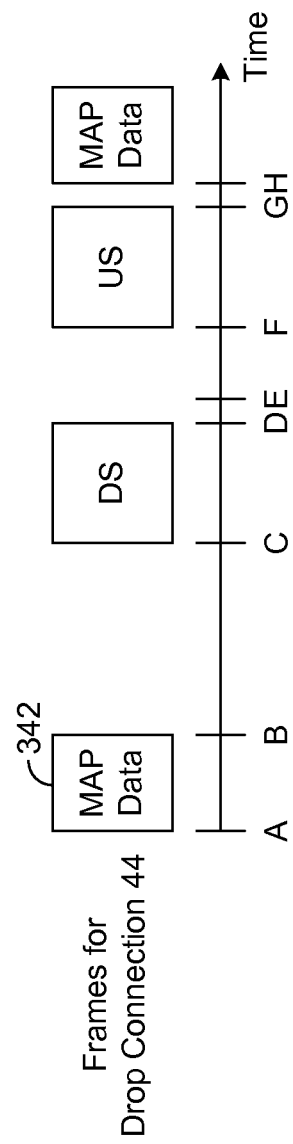

To better illustrate the foregoing, refer to FIG. 19, which illustrates an exemplary frame structure for the embodiment depicted by FIG. 17. In this regard, the DP controller 52 provides the DP transceivers 311 and 313 with control data such that, during the MAP data time slots from time A to time B, the DP transceiver 311 transmits a set 341 of MAP data across the drop connection 41 to the CP transceiver 33, and during the same time slots, the DP transceiver 313 transmits a set 342 of MAP data across the drop connection 44 to the CP transceiver 36.

The set 341 of MAP data transmitted across the drop connection 41 includes a respective slot indicator for each time slot from time B to time H. The slot indicators for the time slots from time B to time C indicate that such time slots are allocated for downstream transmission. Based on such indicators, the CP controller 303 is aware that the DP transceiver 311 is permitted to transmit across the drop connection 41 from time B to time C. Thus, during such time period, the DP controller 52 controls the DP transceiver 311 such that it transmits data across the drop connection 41, and the CP controller 303 controls the CP transceiver 33 such that it listens for and receives such data.

Note that the set 342 of MAP data transmitted across the drop connection 44 also includes a respective slot indicator for each time slot from time B to time H. However, the slot indicators for the time slots from time B to time C indicate that such time slots are unallocated. Based on such indicators, the CP controller 306 is aware that the DP transceiver 313 and the CP transceiver 36 are not permitted to transmit across the drop connection 44 from time B to time C. Thus, during such time period, the controllers 52 and 306 control the DP transceiver 313 and the CP transceiver 36, respectively, such that these transceivers 313 and 36 do not transmit across the drop connection 44. If desired, the controllers 52 and 306 may power down components of the DP transceiver 313 and the CP transceiver 36, respectively, such as AFE circuitry 167 (FIG. 13).

Accordingly, from time B to time C, only the DP transceiver 311 is permitted to transmit across any of the drop connections. Energy from the transmissions by the DP transceiver 311 couples from the drop connection 41 to the drop connection 44. However, during this period, no data is being communicated across the drop connection 44, and both the DP transceiver 313 and the CP transceiver 36 are not listening. Thus, the energy that couples from the drop connection 41 to the drop connection 44 between time B and time C does not interfere with communications between the DP transceiver 313 and the CP transceiver 36. Further, since the DP transceiver 313 and the CP transceiver 36 are not transmitting during this time period, there is no crosstalk that couples from the drop connection 44 to the drop connection 41. Accordingly, crosstalk is avoided during the period from time B to time C.

In the set 342 of MAP data transmitted across the drop connection 44, the slot indicators for the time slots from time C to time D indicate that such time slots are allocated for downstream transmission. Based on such indicators, the CP controller 306 is aware that the DP transceiver 313 is permitted to transmit across the drop connection 44 from time C to time D. Thus, during such time period, the DP controller 52 controls the DP transceiver 313 such that it transmits data across the drop connection 44, and the CP controller 306 controls the CP transceiver 36 such that it listens for and receives such data.

In the set 341 of MAP data transmitted across the drop connection 41, the slot indicators for the time slots from time C to time D indicate that such time slots are unallocated. Based on such indicators, the CP controller 303 is aware that the DP transceiver 311 and the CP transceiver 33 are not permitted to transmit across the drop connection 41 from time C to time D. Thus, during such time period, the controllers 52 and 303 control the DP transceiver 311 and the CP transceiver 303, respectively, such that these transceivers 311 and 303 do not transmit across the drop connection 41. If desired, the controllers 52 and 303 may power down components of the DP transceiver 311 and the CP transceiver 33, respectively, such as AFE circuitry 166 (FIG. 13).

Accordingly, from time C to time D, only the DP transceiver 313 is permitted to transmit across any of the drop connections. Energy from the transmissions by the DP transceiver 313 couples from the drop connection 44 to the drop connection 41. However, during this period, no data is being communicated across the drop connection 41, and both the DP transceiver 311 and the CP transceiver 33 are not listening. Thus, the energy that couples from the drop connection 44 to the drop connection 41 between time C and time D does not interfere with communications between the DP transceiver 311 and the CP transceiver 33. Further, since the DP transceiver 311 and the CP transceiver 33 are not transmitting during this time period, there is no crosstalk that couples from the drop connection 41 to the drop connection 44. Accordingly, crosstalk is avoided during the period from time C to time D.

In the set 341 of MAP data transmitted across the drop connection 41, the slot indicators for the time slots from time E to time F indicate that such time slots are allocated for upstream transmission. Based on such indicators, the CP controller 303 is aware that the CP transceiver 33 is permitted to transmit across the drop connection 41 from time E to time F. Thus, during such time period, the CP controller 303 controls the CP transceiver 33 such that it transmits data across the drop connection 41, and the DP controller 52 controls the DP transceiver 311 such that it listens for and receives such data.

In the set 342 of MAP data transmitted across the drop connection 44, the slot indicators for the time slots from time E to time F indicate that such time slots are unallocated. Based on such indicators, the CP controller 306 is aware that the DP transceiver 313 and the CP transceiver 36 are not permitted to transmit across the drop connection 44 from time E to time F. Thus, during such time period, the controllers 52 and 306 control the DP transceiver 313 and the CP transceiver 36, respectively, such that these transceivers 313 and 36 do not transmit across the drop connection 44. If desired, the controllers 52 and 306 may power down components of the DP transceiver 313 and the CP transceiver 36, respectively, such as AFE circuitry 167 (FIG. 13).

Accordingly, from time E to time F, only the CP transceiver 33 is permitted to transmit across any of the drop connections. Energy from the transmissions by the CP transceiver 33 couples from the drop connection 41 to the drop connection 44. However, during this period, no data is being communicated across the drop connection 44, and both the DP transceiver 313 and the CP transceiver 36 are not listening. Thus, the energy that couples from the drop connection 41 to the drop connection 44 between time E and time F does not interfere with communications between the DP transceiver 313 and the CP transceiver 36. Further, since the DP transceiver 313 and the CP transceiver 36 are not transmitting during this time period, there is no crosstalk that couples from the drop connection 44 to the drop connection 41. Accordingly, crosstalk is avoided during the period from time E to time F.

In the set 342 of MAP data transmitted across the drop connection 44, the slot indicators for the time slots from time F to time G indicate that such time slots are allocated for upstream transmission. Based on such indicators, the CP controller 306 is aware that the CP transceiver 36 is permitted to transmit across the drop connection 44 from time F to time G. Thus, during such time period, the CP controller 306 controls the CP transceiver 36 such that it transmits data across the drop connection 44, and the DP controller 52 controls the DP transceiver 313 such that it listens for and receives such data.

In the set 341 of MAP data transmitted across the drop connection 41, the slot indicators for the time slots from time F to time G indicate that such time slots are unallocated. Based on such indicators, the CP controller 303 is aware that the DP transceiver 311 and the CP transceiver 33 are not permitted to transmit across the drop connection 41 from time F to time G. Thus, during such time period, the controllers 52 and 303 control the DP transceiver 311 and the CP transceiver 33, respectively, such that these transceivers 311 and 33 do not transmit across the drop connection 41. If desired, the controllers 52 and 303 may power down components of the DP transceiver 311 and the CP transceiver 33, respectively, such as AFE circuitry 167 (FIG. 13).

Accordingly, from time F to time G, only the CP transceiver 36 is permitted to transmit across any of the drop connections. Energy from the transmissions by the CP transceiver 36 couples from the drop connection 44 to the drop connection 41. However, during this period, no data is being communicated across the drop connection 41, and both the DP transceiver 311 and the CP transceiver 33 are not listening. Thus, the energy that couples from the drop connection 44 to the drop connection 41 between time F and time G does not interfere with communications between the DP transceiver 311 and the CP transceiver 33. Further, since the DP transceiver 311 and the CP transceiver 33 are not transmitting during this time period, there is no crosstalk that couples from the drop connection 41 to the drop connection 44. Accordingly, crosstalk is avoided during the period from time F to time G.

As indicated above, transmission of the set 341 of MAP data overlaps with transmission of the set 342 of MAP data. That is, the data sets 341 and 342 are transmitted across the drop connections 41 and 44, respectively, at the same time. Accordingly, crosstalk may affect the communication of such data sets 341 and 342. To help mitigate the effects of crosstalk, a different bit loading is preferably used for transmission of the data sets 341 and 342 relative to the bit loading used for data transmissions during other time periods, such as from time B to time H. Specifically, the bit loading for the data sets 341 and 342 is reduced such that the data rate for the MAP data transmitted between times A and B is less than the data rate for data transmitted between times B and H. Thus, each symbol transmitted between times A and B carries less data than each symbol transmitted between times B and H.

In this regard, in a DMT system, each subcarrier is modulated with digital data using QAM or some other modulation technique, as described above. Bit loading generally refers to the number of bits used to modulate a subcarrier. A higher bit loading corresponds to more bits per subcarrier and, hence, a higher data rate. During periods of significant noise, reducing the bit loading and, hence, the data rate can help to reduce transmission errors resulting in improved signal quality. In the instant embodiment, using a lower bit loading for the transmissions of the MAP data helps the system to better withstand errors from crosstalk that results from communicating the MAP data during the same time periods. However, since crosstalk avoidance techniques are used in other time periods (e.g., from time B to time H), thereby reducing the overall noise of the communication channel, it should be possible to increase the bit loading during these other time periods in order to achieve a higher data rate while still achieving a desired signal quality.

Figure 20:
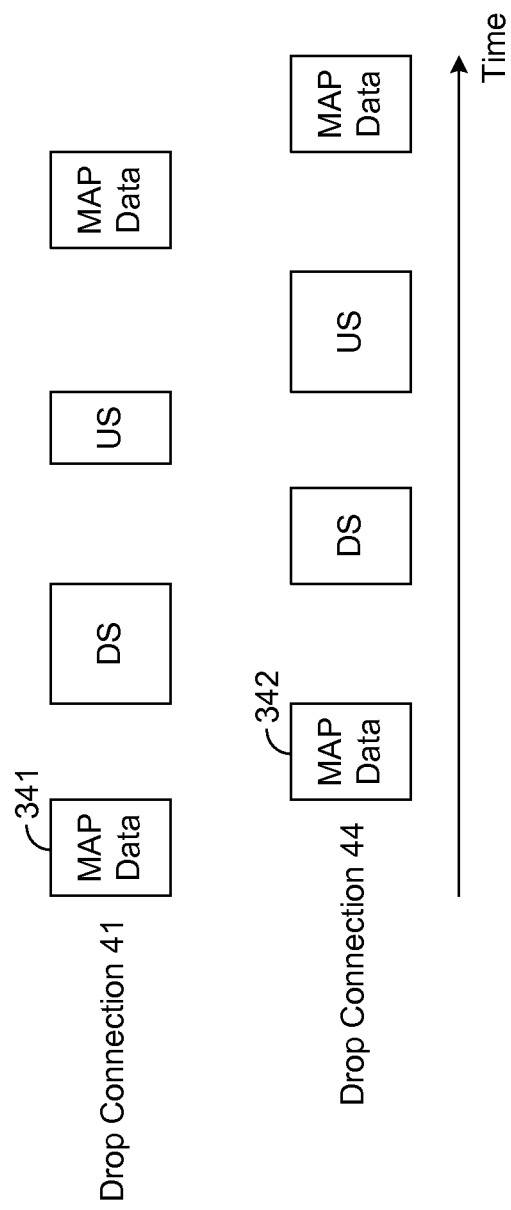
FIG. 20 illustrates an exemplary framing structure for the DP and the CP transceivers depicted by FIG. 17 where time slots for MAP data are staggered.

If reducing the bit loading does not result in a desired signal quality for the transmissions of the MAP data, it is possible to stagger the time slots for transmitting the MAP data per drop connection such that transmission of the MAP data across one drop connection does not interfere with transmissions of MAP data across any other drop connection. FIG. 20 shows an exemplary frame structure that is similar to that of FIG. 19 except that the time slots for transmitting the MAP data are staggered per drop connection, as described above. That is, transmission of the set of MAP data 342 across the drop connection 44 does not begin until the transmission of the set of MAP data 341 across the drop connection 41 ends. Staggering the time slots for the MAP data in such manner avoids crosstalk for communication of the MAP data but also undesirably reduces the available number of time slots for upstream and downstream data transmissions, thereby reducing the overall throughput of the system.

It should be emphasized that the embodiments described herein are exemplary, and various changes and modifications to the disclosed embodiments would be apparent to a person of ordinary skill upon reading this disclosure. As an example, crosstalk avoidance and other communication techniques are generally described above for use on drop connections extending between customer premises and a DP. It is possible to employ such crosstalk avoidance and other communication techniques in other locations and for other types of connections.

Now, therefore, the following is claimed:

1. A distribution point, comprising:
    a first distribution point (DP) transceiver coupled to a first point-to-point (PTP) connection and configured to communicate with a first customer premises (CP) transceiver via the first PTP connection;
    a second DP transceiver coupled to a second PTP connection and configured to communicate with a second CP transceiver via the second PTP connection; and
    a controller coupled to the first and second DP transceivers, the controller configured to control the first and second DP transceivers such that (1) the first DP transceiver transmits across the first PTP connection a first set of control data for a first frame and (2) the second DP transceiver transmits across the second PTP connection a second set of control data for a second frame that overlaps in time with the first frame, the first set of control data identifying a plurality of downstream time slots allocated to the first DP transceiver for the first frame and a plurality of upstream time slots allocated to the first CP transceiver for the first frame, the second set of control data identifying a plurality of downstream time slots allocated to the second DP transceiver for the second frame and a plurality of upstream time slots allocated to the second CP transceiver for the second frame, wherein the controller is configured to dynamically schedule upstream and downstream transmissions across the first and second PTP connections such that the controller ensures that the upstream time slots and the downstream time slots of the first frame are prevented from overlapping in time with the upstream time slots and the downstream time slots of the second frame, thereby avoiding crosstalk between the first and second PTP connections during communication of the first and second frames across the first and second PTP connections, respectively,
    wherein the first set of control data is defined such that the first frame has a first gap between the downstream time slots and the upstream time slots of the first frame thereby preventing the first DP transceiver and the first CP transceiver from transmitting across the first PTP connection during the first gap, wherein the second set of control data is defined such that the second frame has a second gap between the downstream time slots and the upstream time slots of the second frame thereby preventing the second DP transceiver and the second CP transceiver from transmitting across the second PTP connection during the second gap, and wherein the second set of control data is further defined such that the downstream time slots or the upstream time slots of the second frame occur during the first gap thereby permitting the second DP transceiver or the second CP transceiver to transmit across the second PTP connecting during the first gap.

2. The distribution point of claim 1, wherein the first and second sets of control data are simultaneously transmitted across the first and second PTP connections, respectively.

3. The distribution point of claim 2, wherein the first DP transceiver is configured to transmit at least a first discrete multi-tone (DMT) symbol and a second DMT symbol in the first frame, wherein the first DMT symbol includes at least a portion of the first set of control data, and wherein a bit loading for the first DMT symbol is different than a bit loading for the second DMT symbol.

4. The distribution point of claim 1, wherein the controller is configured to schedule the transmissions across the first and second PTP connections such that transmission of the first set of control data across the first PTP connection for indicating time slot allocation for the first PTP connection is prevented from overlapping in time with transmission of the second set of control data across the second PTP connection for indicating time slot allocation for the second PTP connection.

5. A method for use at a distribution point, comprising:
    communicating between a first distribution point (DP) transceiver and a first customer premises (CP) transceiver via a first point-to-point (PTP) connection having an end coupled to the first DP transceiver and an end coupled to the first CP transceiver;
    communicating between a second DP transceiver and a second CP transceiver via a second PTP connection having an end coupled to the second DP transceiver and an end coupled to the second CP transceiver;
    scheduling, with a controller, upstream and downstream transmissions across the first and second PTP connections;
    transmitting, by the first DP transceiver, a first set of control data for a first frame across the first PTP connection, the first set of control data identifying a plurality of downstream time slots for the first frame allocated to the first DP transceiver and a plurality of upstream time slots for the first frame allocated to the first CP transceiver;
    transmitting, by the second DP transceiver, a second set of control data for a second frame that overlaps in time with the first frame across the second PTP connection, the second set of control data identifying a plurality of downstream time slots for the second frame allocated to the second DP transceiver and a plurality of upstream time slots for the second frame allocated to the second CP transceiver; and
    wherein the scheduling comprises ensuring that the upstream time slots and the downstream time slots of the first frame are prevented from overlapping in time with the upstream time slots and the downstream time slots of the second frame, thereby avoiding crosstalk between the first and second PTP connections during communication of the first and second frames across the first and second PTP connections, respectively,
    wherein the first set of control data is defined such that the first frame has a first pap between the downstream time slots and the upstream time slots of the first frame thereby preventing the first DP transceiver and the first CP transceiver from transmitting across the first PTP connection during the first gap, wherein the second set of control data is defined such that the second frame has a second gap between the downstream time slots and the upstream time slots of the second frame thereby preventing the second DP transceiver and the second CP transceiver from transmitting across the second PTP connection during the second gap, and wherein the second set of control data is further defined such that the downstream time slots or the upstream time slots of the second frame occur during the first gap thereby permitting the second DP transceiver or the second CP transceiver to transmit across the second PTP connection during the first gap.

6. The method of claim 5, wherein the first and second sets of control data are simultaneously transmitted across the first and second PTP connections, respectively.

7. The method of claim 6, wherein the first frame includes a first discrete multi-tone (DMT) symbol and a second DMT symbol, wherein the first DMT symbol includes at least a portion of the first set of control data, and wherein a bit loading for the first DMT symbol is different than a bit loading for the second DMT symbol.

8. A distribution point, comprising:

a first distribution point (DP) transceiver coupled to a first point-to-point (PTP) connection and configured to communicate with a first customer premises (CP) transceiver via the first PTP connection;

a second DP transceiver coupled to a second PTP connection and configured to communicate with a second CP transceiver via the second PTP connection; and a controller coupled to the first DP transceiver and the second DP transceiver, the controller configured to provide control data to the first DP transceiver and the second DP transceiver such that the first DP transceiver is configured to transmit a first frame across the first PTP connection to the first CP transceiver and the second DP transceiver is configured to transmit a second frame that overlaps in time with the first frame across the second PTP connection to the second CP transceiver, wherein the first frame has a first set of control data indicating which time slots of the first frame are allocated to the first DP transceiver for downstream communications across the first PTP connection and which time slots of the first frame are allocated to the first CP transceiver for upstream communications across the first PTP connection, and wherein the second frame has a second set of control data indicating which time slots of the second frame are allocated to the second DP transceiver for downstream communications across the second PTP connection and which time slots of the second frame are allocated to the second CP transceiver for upstream communications across the second PTP connection, wherein the first set of control data and the second set of control data indicate a transmission schedule for the first and second PTP connections such that the controller ensures that the time slots of the first frame allocated for upstream and downstream communications across the first PTP connection are prevented from overlapping in time with the time slots of the second frame allocated for upstream and downstream communications across the second PTP connection thereby avoiding crosstalk between the first and second PTP connections during communication of the first and second frames across the first and second PTP connections, respectively, wherein the first set of control data is defined such that the first frame has a first gap between the time slots allocated to the first DP transceiver and the slots allocated to the first CP transceiver thereby preventing the first DP transceiver and the first CP transceiver from transmitting across the first PTP connection during the first gap, wherein the second set of control data is defined such that the second frame has a second gap between the time slots allocated to the second DP transceiver and the time slots allocated to the second CP transceiver thereby preventing the second DP transceiver and the second CP transceiver from transmitting across the second PTP connection during the second gap, and wherein the second set of control data is further defined such that the time slots allocated to the second DP transceiver or the time slots allocated to the second CP transceiver occur during the first gap thereby permitting the second DP transceiver or the second CP transceiver to transmit across the second PTP connection during the first gap.

9. A communication system, comprising:

a first transceiver coupled to a first point-to-point (PTP) connection and configured to communicate with a first customer premises (CP) transceiver via the first PTP connection;

a second transceiver coupled to a second PTP connection and configured to communicate with a second CP transceiver via the second PTP connection; and a controller coupled to the first transceiver and the second transceiver, the controller configured to control the first and second transceivers such that (1) the first transceiver transmits across the first PTP connection a first set of control data for a first frame and (2) the second transceiver transmits across the second PTP connection a second set of control data for a second frame that overlaps in time with the first frame, the first set of control data identifying a plurality of downstream transmission slots allocated to the first transceiver for the first frame and a plurality of upstream transmission slots allocated to the first CP transceiver for the first frame, the second set of control data identifying a plurality of downstream transmission slots allocated to the second transceiver for the second frame and a plurality of upstream transmission slots allocated to the second CP transceiver for the second frame, wherein the controller is configured to schedule communications across the first and second PTP connections such that the controller ensures that the upstream transmission slots and the downstream transmission slots of the first frame are prevented from overlapping in time with the upstream transmission slots and the downstream transmission slots of the second frame, thereby avoiding crosstalk between the first and second PTP connections during communication of the first and second frames across the first and second PTP connections, respectively, wherein the first set of control data is defined such that the first frame has a first gap between the downstream transmission slots and the upstream transmission slots of the first frame thereby preventing the first transceiver and the first CP transceiver from transmitting across the first PTP connection during the first gap, wherein the second set of control data is defined such that the second frame has a second gap between the downstream transmission slots and the upstream transmission slots of the second frame thereby preventing the second transceiver and the second CP transceiver from transmitting across the second PTP connection during the second gap, and wherein the second set of control data is further defined such that the downstream transmission slots or the upstream transmission slots of the second frame occur during the first gap thereby permitting the second transceiver or the second CP transceiver to transmit across the second PTP connection during the first gap.

10. The distribution point of claim 1, wherein the first PTP connection is bound by a binder, and wherein the second PTP connection is bound by the binder.

11. The distribution point of claim 1, wherein the first set of control data has slot indicators for the time slots in the first frame, each of the slot indicators indicating whether a corresponding time slot in the first frame is allocated for upstream communication or downstream communication.

12. The method of claim 5, wherein the first PTP connection is bound by a binder, and wherein the second PTP connection is bound by the binder.

13. The method of claim 5, wherein the first set of control data has slot indicators for the time slots in the first frame, each of the slot indicators indicating whether a corresponding time slot in the first frame is allocated for upstream communication or downstream communication.

* * * * *